United States Patent
Zimm et al.

(10) Patent No.: US 9,746,214 B2
(45) Date of Patent: Aug. 29, 2017

(54) USE OF UNIDIRECTIONAL FLOW MODES OF MAGNETIC COOLING SYSTEMS

(71) Applicant: Astronautics Corporation of America, Milwaukee, WI (US)

(72) Inventors: Carl B. Zimm, Madison, WI (US); Steven L. Russek, Glendale, WI (US); Andre Boeder, Monona, WI (US)

(73) Assignee: ASTRONAUTICS CORPORATION OF AMERICA, Milwaukee, WI (US)

( * ) Notice: Subject to any disclaimer, the term of this patent is extended or adjusted under 35 U.S.C. 154(b) by 328 days.

(21) Appl. No.: 14/105,843

(22) Filed: Dec. 13, 2013

(65) Prior Publication Data

US 2014/0165595 A1    Jun. 19, 2014

Related U.S. Application Data

(60) Provisional application No. 61/738,230, filed on Dec. 17, 2012.

(51) Int. Cl.
*F25B 21/00*    (2006.01)

(52) U.S. Cl.
CPC ........ *F25B 21/00* (2013.01); *F25B 2321/002* (2013.01); *F25B 2321/0022* (2013.01); *Y02B 30/66* (2013.01)

(58) Field of Classification Search
CPC ...... F25B 2321/0021; F25B 2321/0022; F25B 2321/0023; F25B 47/02
See application file for complete search history.

(56) References Cited

U.S. PATENT DOCUMENTS

| | | | |
|---|---|---|---|
| 4,332,135 A | 6/1982 | Barclay et al. | |
| 4,702,090 A | 10/1987 | Barclay et al. | |
| 5,249,424 A | 10/1993 | DeGregoria et al. | |
| 5,934,078 A | 8/1999 | Lawton et al. | |

(Continued)

FOREIGN PATENT DOCUMENTS

| | | |
|---|---|---|
| DE | 10 2006 011 | 9/2007 |
| EP | 2 420 760 A1 | 2/2012 |

(Continued)

OTHER PUBLICATIONS

International Search Report and Written Opinion in International Application No. PCT/US2013/075009 dtd Aug. 26, 2014 (13 pages).

(Continued)

*Primary Examiner* — Allen Flanigan
*Assistant Examiner* — Filip Zec
(74) *Attorney, Agent, or Firm* — Foley & Lardner LLP

(57) ABSTRACT

A dual-mode magnetic refrigeration apparatus includes beds of magnetocaloric material, a magnet to apply a time-varying magnetic field to the beds, a heat transfer fluid (HTF), a pump to circulate the HTF, a hot side heat exchanger (HHEX), a cold side heat exchanger (CHEX), valves to direct flow of the HTF, and a controller configured to control periodic switching of the valves to allow the apparatus to operate in a first mode and in a second mode. The first mode transfers heat from the CHEX to the HHEX. In the second mode of operation, the periodic switching of the valves is suspended to allow unidirectional flow of the HTF through the HHEX, the beds, and the CHEX such that heat is transferred from the HHEX to the CHEX.

27 Claims, 14 Drawing Sheets

(56) References Cited

U.S. PATENT DOCUMENTS

| | | | |
|---|---|---|---|
| 6,526,759 B2 | 3/2003 | Zimm et al. | |
| 6,668,560 B2 | 12/2003 | Zimm et al. | |
| 6,935,121 B2* | 8/2005 | Fang | F25B 21/00 62/3.1 |
| 6,946,941 B2 | 9/2005 | Chell | |
| 7,148,777 B2 | 12/2006 | Chell et al. | |
| 7,481,064 B2* | 1/2009 | Kitanovski | F25B 21/00 62/3.1 |
| 7,650,756 B2* | 1/2010 | Muller | F25B 21/00 62/3.1 |
| 8,037,692 B2* | 10/2011 | Muller | F25B 21/00 62/3.1 |
| 2002/0053209 A1 | 5/2002 | Zimm et al. | |
| 2009/0308079 A1 | 12/2009 | Lee | |
| 2010/0000228 A1* | 1/2010 | Wiest | F25B 21/00 62/3.1 |
| 2011/0146300 A1 | 6/2011 | Duval | |

FOREIGN PATENT DOCUMENTS

| | | |
|---|---|---|
| JP | 2002-106999 | 4/2002 |
| WO | WO-03/016794 A1 | 2/2003 |

OTHER PUBLICATIONS

Barcza, et al., "Stability and magnetocaloric properties of sintered La(Fe,Mn,Si)13Hz alloys," presented at the IEEE International Magnetics Conference (Taipei, Taiwan) 2011, session ED-07.

Dung, et al., "Mixed Magnetism for Refrigeration and Energy Conversion," Advanced Energy Materials 1, 1215, (2011), 6 pages.

Engelbrecht, et al., "Recent developments in room temperature active magnetic regenerative refrigeration," HVAC and R Research 13(4), pp. 525-542 (2007).

Frischmann, et al., "Measuring Nusselt number using a single-blow regenerator facility," Proc. 3rd Int. Conf. on Mag. Refrig. at Room Temp., pp. 443-448 (2009).

Jacobs, "Modeling and optimal design of a multilayer active magnetic refrigeration system," Proc. 3rd Int. Conf on Mag. Refrig. at Room Temp., pp. 267-273 (2009).

Jacobs, et al., "Modeling of a magnetic refrigeration system with a layered bed," Proceedings of the 2010 International Symposium on Next-generation Air Conditioning and Refrigeration Technology (Japan): P09-1-P09-9, 2010.

Jacobs, et al., "The Performance of a Large-Scale Rotary Magnetic Refrigerator," Proceedings of the $5^{th}$ International Conference on Magnetic Refrigeration at Room Temperature, Sep. 2012; published in the International Journal of Refrigeration, 37 (2014), pp. 84-91.

Jasinski, et al., "La(Fe,Co,Si)13 bulk alloys and ribbons with high temperature magnetocaloric effect," Journal of Applied Physics, v107, n9, p. 09A953 (3 pages), 2010.

Russek, at al., "The performance of a rotary magnet magnetic refrigerator with layered beds," Proc. 4th Conference on Magnetic Refrigeration at Room Temperature, Baotou, China, Aug. 23-28, 2010, pp. 339-349.

Russek, et al., "Potential for cost effective magnetocaloric air conditioning systems," Int. J. of Refrig. 29(8), pp. 1366-1373 (2006).

Zimm, et al., "Design and initial performance of a magnetic refrigerator with a rotating permanent magnet," Proceedings of the 2nd International Conference on Magnetic Refrigeration at Room Temperature: pp. 341-347 (2007).

Zimm, et al., "Design and performance of a permanent-magnet rotary refrigerator," Int. J. of Refrig. 29(8), pp. 1302-1306 (2006).

Zimm, et al., "Near room temperature magnetic refrigeration: the path to applications," Proc. 3rd Int. Conf. on Mag. Refrig. at Room Temp., pp. 355-361 (2009).

Office Action in CN Appl. No. 201380065944.0 dated Jan. 18, 2016 (5 pages).

Office Action in JP Appl. 2015-547987 dated Jan. 4, 2016, with English translation (10 pages).

Supplementary Partial European Search Report dated Jan. 19, 2017 for EP Appl. 13864149.

Extended European Search Report in Ep 13864149, dated May 22, 2017 (10 pp.) (012890-0253).

* cited by examiner

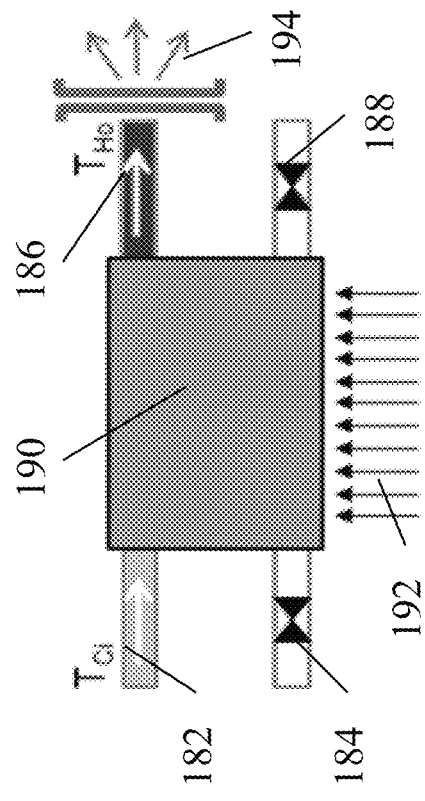
Figure 1a: Magnetization
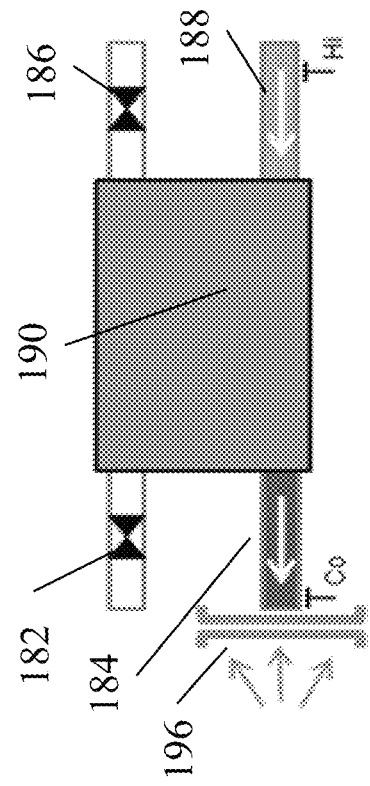
Figure 1b: Cold-to-Hot Flow
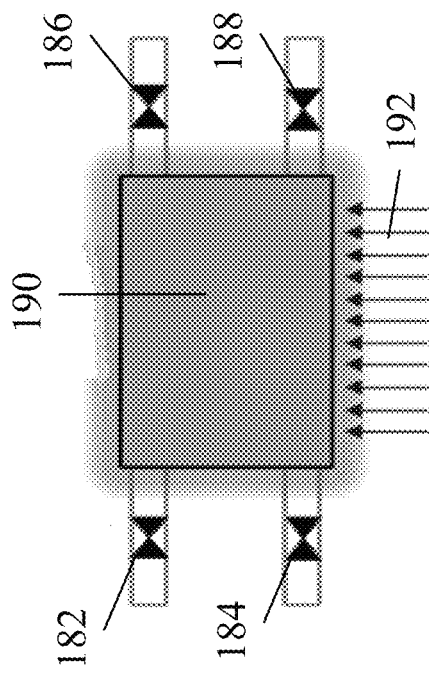
Figure 1c: Demagnetization
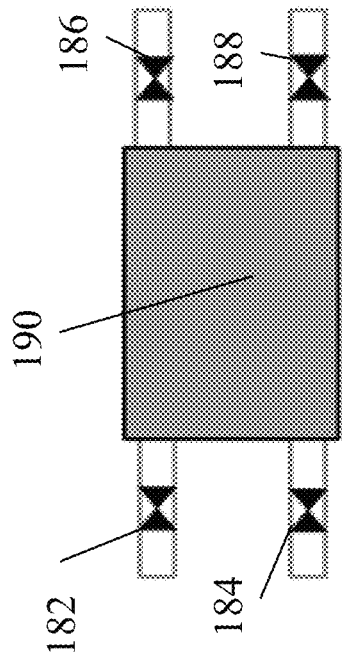
Figure 1d: Hot-to-Cold Flow

USE OF UNIDIRECTIONAL FLOW MODES OF MAGNETIC COOLING SYSTEMS

CROSS-REFERENCE TO RELATED APPLICATIONS

The present application claims priority to U.S. Provisional Application No. 61/738,230 filed on Dec. 17, 2012, the entire disclosure of which is incorporated herein by reference.

BACKGROUND

Modern room-temperature magnetic refrigeration (MR) systems may employ an Active Magnetic Regenerator (AMR) cycle to perform cooling. An early implementation of the AMR cycle can be found in U.S. Pat. No. 4,332,135, the entire disclosure of which is incorporated herein by reference. The AMR cycle has four stages, as shown schematically in FIGS. 1a to 1d. The MR system in FIGS. 1a to 1d includes a porous bed of magnetocaloric material (MCM) 190 and a heat transfer fluid, which exchanges heat with the MCM as it flows through the MCM bed 190. In FIGS. 1a to 1d, the left side of the bed is the cold side, while the hot side is on the right. In alternative embodiments, the hot and cold sides may be reversed. The timing and direction (hot-to-cold or cold-to-hot) of the fluid flow may be coordinated with the application and removal of a magnetic field. The magnet field may be provided by either a permanent magnet, electromagnet, or superconducting magnet.

In an illustrative example of an AMR cycle, FIG. 1a, the first stage of the cycle, "magnetization," occurs. While the fluid in the MCM bed 190 is stagnant, a magnetic field 192 is applied to the MCM bed 190, causing it to heat. In the magnetization stage shown in FIG. 1a, four valves shown are all closed, preventing fluid flow through the MCM bed 190. The four valves include a cold inlet valve 182, a cold outlet valve 184, a hot outlet valve 186, and a hot inlet valve 188. In FIG. 1b, the second stage of the cycle, "cold-to-hot-flow" occurs. The magnetic field 192 over the MCM bed 190 is maintained, and fluid at a temperature $T_{Ci}$ (the cold inlet temperature) is pumped through the MCM bed 190 from the cold side to the hot side. The cold inlet valve 182 and hot outlet valve 186 are open during this stage to facilitate movement of the fluid through the MCM bed 190. The cold outlet valve 184 and the hot inlet valve 188 are closed during this stage. The fluid removes heat from each section of the MCM bed 190, cooling the MCM bed 190 and warming the fluid as it passes to the next section of the MCM bed 190, where the process continues at a higher temperature. The fluid eventually reaches the temperature $T_{Ho}$ (the hot outlet temperature), where it exits the MCM bed 190 through the hot outlet valve 186. Typically, this fluid is circulated through a hot side heat exchanger (HHEX) 194, where it exhausts its heat to the ambient environment. In FIG. 1c, the third stage, "demagnetization", occurs. The fluid flow is terminated when the cold inlet valve 182 and the hot outlet valve 186 are closed and the magnetic field 192 is removed. The cold outlet valve 184 and the hot inlet valve 188 are also closed during this stage. This causes the MCM bed 190 to cool further. In FIG. 1d, the final stage of the cycle, "hot-to-cold-flow", occurs. Here, fluid at a temperature $T_{Hi}$ (the hot inlet temperature) is pumped through the MCM bed 190 from the hot side to the cold side in the continued absence of the magnetic field 192. In this stage, cold outlet valve 184 and hot inlet valve 188 are open, while cold inlet valve 182 and hot outlet valve 186 are closed. The fluid adds heat to each section of the MCM bed 190, warming the MCM bed 190 and cooling the fluid as it passes to the next section of the MCM bed 190, where the process continues at a lower temperature. The fluid eventually reaches a temperature $T_{Co}$ (the cold outlet temperature) which is the coldest temperature reached by the fluid in the cycle. Typically, this colder fluid is circulated through a cold side heat exchanger (CHEX) 196, where it picks up heat from the refrigerated system, allowing this system to maintain its cold temperature.

A major advantage of the AMR cycle is noted in K. L. Engelbrecht, G. F Nellis, S. A Klein, and C. B. Zimm, Recent Developments in Room Temperature Active Magnetic Regenerative Refrigeration, HVAC&R Research, 13 (2007) pp. 525-542 (hereinafter "Engelbrecht et al."), the entire disclosure of which is incorporated herein by reference. The advantage is that the span (the temperature at which the heat is exhausted minus the temperature at which heat is absorbed) can be much larger than the absolute value of the temperature change of the magnetocaloric material when the magnetic field is applied (the adiabatic temperature change, Delta-$T_{ad}$).

The time that it takes to complete execution of the four stages of the AMR cycle is called the cycle time, and its inverse is known as the cycle frequency. The "temperature span" of the MR system is defined as $T_{Hi}-T_{Ci}$, which is the difference in the inlet fluid temperatures. The AMR cycle is analogous to a vapor compression cycle, where gas compression (which causes the gas to heat) plays the role of magnetization, and where free expansion of the gas (which drops the gas temperature) plays the role of demagnetization. In the vapor compression cycle, the heat transfer fluid changes phase in the CHEX and HHEX to aid in heat transfer. No such phase change need occur in the CHEX and HHEX of the AMR cycle, but a fluid with a high single phase heat transfer coefficient, such as water, may be used. Although FIGS. 1a to 1d illustrate the operation of a single-bed MR system, in alternative embodiments, multiple beds, each undergoing the same AMR cycle, may be combined in a single system to increase the cooling power, reduce the system size, or otherwise improve the implementation of the AMR cycle.

SUMMARY

A dual-mode magnetic refrigeration apparatus includes one or more beds of magnetocaloric material, a magnet to apply a time-varying magnetic field to the one or more beds of magnetocaloric material, a heat transfer fluid, a pump to circulate the heat transfer fluid, a hot side heat exchanger (HHEX), a cold side heat exchanger (CHEX), one or more valves to direct flow of the heat transfer fluid, and a controller configured to control periodic switching of the one or more valves to allow the apparatus to operate in a first mode and in a second mode. In the first mode, the one or more valves direct the heat transfer fluid to a cold end of the one or more beds through the one or more beds to a hot end of the one or more beds and through the HHEX when the time-varying magnetic field applied to the one or more beds is high, and to the hot end of the one or more beds through the one or more beds to the cold end of the one or more beds and through the CHEX when the time-varying magnetic field applied to the one or more beds is low, in order to transfer heat from the CHEX to the HHEX. In the second mode of operation, the periodic switching of the one or more valves is suspended to allow unidirectional flow of the heat transfer fluid through the HHEX, the one or more beds, and the CHEX such that heat is transferred from the HHEX to the CHEX.

A dual-mode magnetic refrigeration apparatus includes one or more beds of magnetocaloric material, a magnet to apply a time-varying magnetic field to the one or more beds of magnetocaloric material, a heat transfer fluid, a pump to circulate the heat transfer fluid, a hot side heat exchanger (HHEX), a cold side heat exchanger (CHEX), one or more valves to direct flow of the heat transfer fluid, and a controller configured to control periodic switching of the one or more valves to allow the apparatus to operate in a first mode and in a second mode. In the first mode, the one or more valves direct the heat transfer fluid to a cold end of the one or more beds through the one or more beds to a hot end of the one or more beds and through the HHEX when the time-varying magnetic field applied to the one or more beds is high, and to the hot end of the one or more beds through the one or more beds to the cold end of the one or more beds and through the CHEX when the time-varying magnetic field applied to the one or more beds is low, in order to transfer heat from the CHEX to the HHEX when an environment of the HHEX is at a similar or higher temperature than an environment of the CHEX. In the second mode of operation, the periodic switching of the one or more valves is suspended to allow unidirectional flow of the heat transfer fluid through the HHEX, the one or more beds, and the CHEX such that heat is transferred from the CHEX to the HHEX when an environment of the HHEX is at a lower temperature than an environment of the CHEX.

A dual-mode magnetic refrigeration apparatus with bypass includes one or more beds of magnetocaloric material, a magnet to apply a time-varying magnetic field to the one or more beds of magnetocaloric material, a heat transfer fluid, a pump to circulate the heat transfer fluid, a hot side heat exchanger (HHEX), a cold side heat exchanger (CHEX), one or more valves to direct flow of the heat transfer fluid, a controller configured to control periodic switching of the one or more valves to allow the apparatus to operate in a first mode and in a second mode. In the first mode, the one or more valves direct the heat transfer fluid to a cold end of the one or more beds through the one or more beds to a hot end of the one or more beds and through the HHEX when the time-varying magnetic field applied to the one or more beds is high, and to the hot end of the one or more beds through the one or more beds to the cold end of the one or more beds and through the CHEX when the time-varying magnetic field applied to the one or more beds is low, in order to transfer heat from the CHEX to the HHEX. In the second mode of operation, the one or more valves are maintained in a bypass arrangement to allow unidirectional flow of the heat transfer fluid through the HHEX and the CHEX such that heat is transferred from the HHEX to the CHEX, and where the heat transfer fluid bypasses the one or more beds while the one or more valves are in a bypass arrangement.

A dual-mode magnetic refrigeration apparatus with bypass includes one or more beds of magnetocaloric material, a magnet to apply a time-varying magnetic field to the one or more beds of magnetocaloric material; a heat transfer fluid, a pump to circulate the heat transfer fluid; a hot side heat exchanger (HHEX), a cold side heat exchanger (CHEX), one or more valves to direct flow of the heat transfer fluid, and a controller configured to control periodic switching of the one or more valves to allow the apparatus to operate in a first mode and in a second mode. In the first mode, the one or more valves direct the heat transfer fluid to a cold end of the one or more beds through the one or more beds to a hot end of the one or more beds and through the HHEX when the time-varying magnetic field applied to the one or more beds is high, and to the hot end of the one or more beds through the one or more beds to the cold end of the one or more beds and through the CHEX when the time-varying magnetic field applied to the one or more beds is low, in order to transfer heat from the CHEX to the HHEX when an environment of the HHEX is at a similar or higher temperature than an environment of the CHEX. In the second mode of operation, the one or more valves are maintained in a bypass arrangement to allow unidirectional flow of the heat transfer fluid through the HHEX and the CHEX such that heat is transferred from the CHEX to the HHEX when an environment of the HHEX is at a lower temperature than an environment of the CHEX, and where the heat transfer fluid bypasses the one or more beds while the one or more valves are in the bypass arrangement.

A combination magnetic refrigerator-freezer apparatus includes a refrigerator compartment that is maintained above 0 degrees Celsius (C), a freezer compartment that is maintained below 0 degrees C., a controller, and one or more magnets configured to generate one or more time-varying magnetic fields. The apparatus also includes a first magnetic refrigeration system for the refrigerator compartment that includes a first set of one or more beds of magnetocaloric material, a first heat transfer fluid (HTF), a first pump to drive flow of the first heat transfer fluid, a hot side heat exchanger (HHEX), a first cold side heat exchanger (CHEX), a first section of an inter-stage heat exchanger (IHEX), and one or more first valves to direct flow of the first heat transfer fluid. The controller is configured to control periodic switching of the one or more valves to direct the first HTF to a cold end of the first set of one or more beds through the first set of one or more beds to a hot end of the first set of one or more beds and through the HHEX when the time-varying magnetic field applied to the first set of one or more beds is high and to a hot end of the first set of one or more beds through the first set of one or more beds to a cold end of the first set of one or more beds and through the first CHEX and the first section of the IHEX when the time-varying magnetic field applied to the first set of one or more beds is low in order to transfer heat from the first CHEX and the first section of the IHEX to the HHEX. The apparatus also includes a second magnetic refrigeration system for the freezer compartment that includes a second set of one or more beds of magnetocaloric material, a second heat transfer fluid, a second pump to drive flow of the second heat transfer fluid, a second CHEX, a second section of the IHEX, and one or more second valves to direct flow of the second heat transfer fluid. The controller is configured to control the periodic switching of the one or more valves to direct the second HTF to a cold end of the second set of one or more beds through the second set of one or more beds to a hot end of the second set of one or more beds and through the second section of the IHEX when the time-varying magnetic field applied to the one or more beds is high and to a hot end of the second set of one or more beds through the second set of one or more beds to a cold end of the second set of one or more beds and through the second CHEX when the time-varying magnetic field applied to the second set of one or more beds is low in order to transfer heat from the second CHEX via the second section of the IHEX to the first section of the IHEX.

BRIEF DESCRIPTION OF THE DRAWINGS

Illustrative embodiments will hereafter be described with reference to the accompanying drawings.

FIG. 1a is a diagram illustrating a "magnetization" stage of an active magnetic regenerator (AMR) cycle in accordance with an illustrative embodiment.

FIG. 1b is a diagram illustrating a "cold-to-hot flow" stage of an active magnetic regenerator (AMR) cycle in accordance with an illustrative embodiment.

FIG. 1c is a diagram illustrating a "demagnetization" stage of an active magnetic regenerator (AMR) cycle in accordance with an illustrative embodiment.

FIG. 1d is a diagram illustrating a "hot-to-cold flow" stage of an active magnetic regenerator (AMR) cycle in accordance with an illustrative embodiment.

DETAILED DESCRIPTION

Described herein are illustrative magnetic refrigeration systems for use in applications such as an improved defroster. In refrigeration systems, the cooling element that removes or absorbs heat from the surrounding environment can often become frosted over with ice. This may occur when the surrounding environment contains water vapor that freezes on the cooling element, thereby lowering its efficiency and requiring more energy to cool the environment. As a result, defrost methods may be used to melt any ice that has accumulated on the cooling element and restoring the efficiency of the cooling element. An illustrative embodiment of a defrost system may include suspending periodic switching of valves in the system to allow unidirectional flow (UDF) of heat transfer fluid (HTF) from a hot side heat exchanger (HHEX) to a cold side heat exchanger (CHEX), such that heat is transferred from the HHEX to the CHEX.

In an illustrative embodiment, one way to implement the AMR cycle is to arrange sector-shaped beds of magnetocaloric material in a wheel assembly, and apply a magnetic field to a sector-shaped section of the wheel using a sector-shaped magnet. The magnetocaloric material beds are porous to fluid flow. In an illustrative embodiment, a set of valves and a pump are set up to enable flow to be sent through the beds in either direction. In alternative embodiments, other arrangements may be used. For AMR operation, either the wheel is rotated or the magnet is rotated, producing a changing magnetic field on the beds, and flow is directed though the beds, with the flow direction switched by valves in synchrony with the position of the wheel or magnet.

Figure 2:
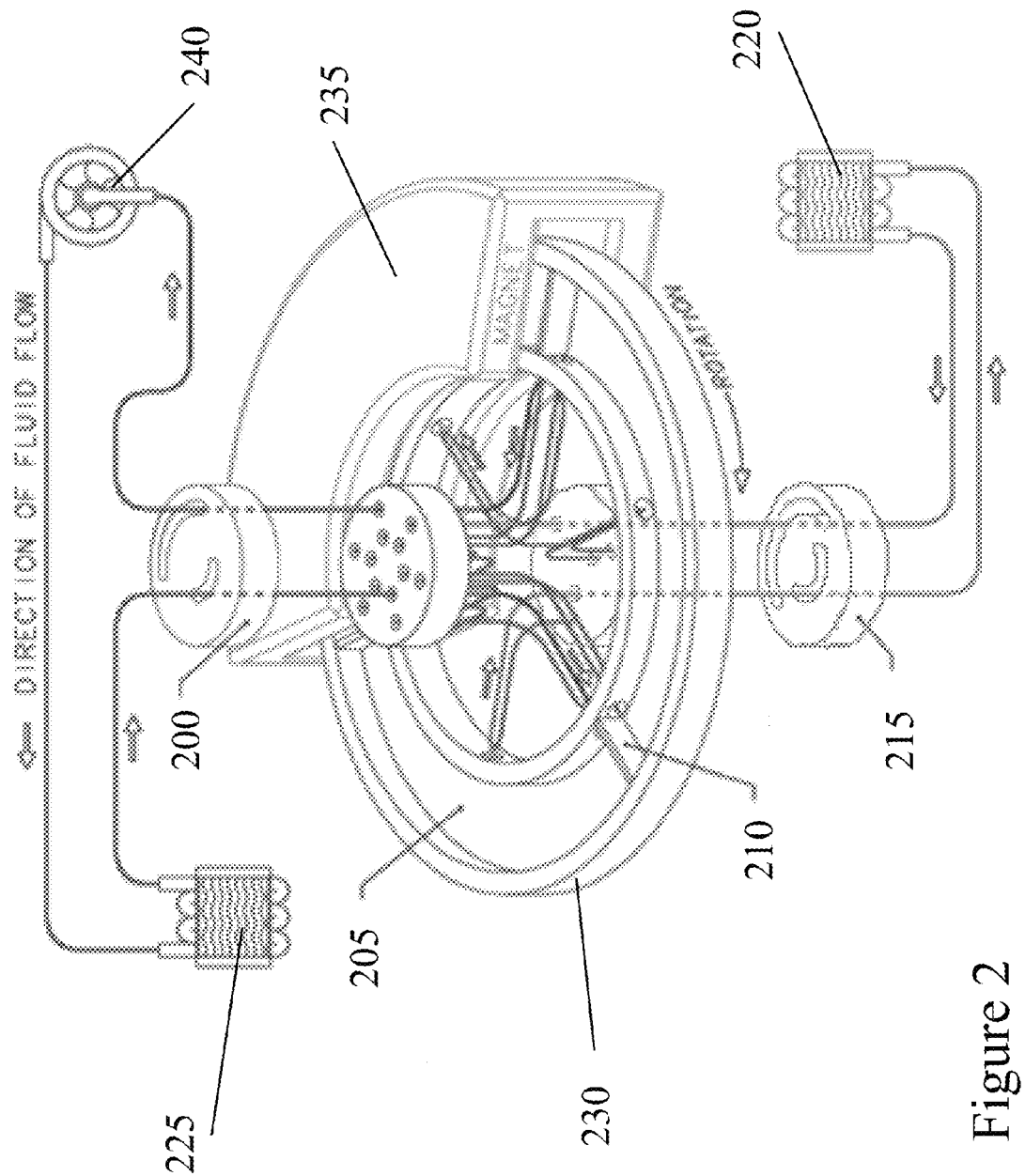
FIG. 2 is a diagram illustrating a rotating bed active magnetic regenerator refrigerator in which the fluid flow is controlled by valves activated by the rotation of the bed wheel in accordance with an illustrative embodiment.

In an illustrative example, FIG. 2 shows an AMR operation where the beds of MCM material are arranged in a wheel assembly that is rotated through a magnetic field. The wheel 230 is comprised of three wheel segments 205. Each wheel segment 205 contains two beds of MCM in which the cold ends of the two beds face each other in the center of a wheel segment. A wheel segment partition 210 separates adjacent wheel segments 205 and also separates the hot ends of two adjacent beds.

The fluid is driven through the MCM bed contained within wheel segment 205 by a pump 240. Fixed valve disks 200 and 215 are used to control when and in which direction fluid is pumped through the MCM bed contained within wheel segment 205. The fixed valve disks 200 and 215 are also used to control the fluid that passes to a hot side heat exchanger (HHEX) 225 and a cold side heat exchanger (CHEX) 220. The pump 240 also drives the fluid through the HHEX 225 and CHEX 220 and the fixed valve disks 200 and 215. Finally, the wheel 230 can be rotated through the magnetic field caused by a magnet 235 to heat up the MCM bed contained within wheel segment 205.

Figure 3:
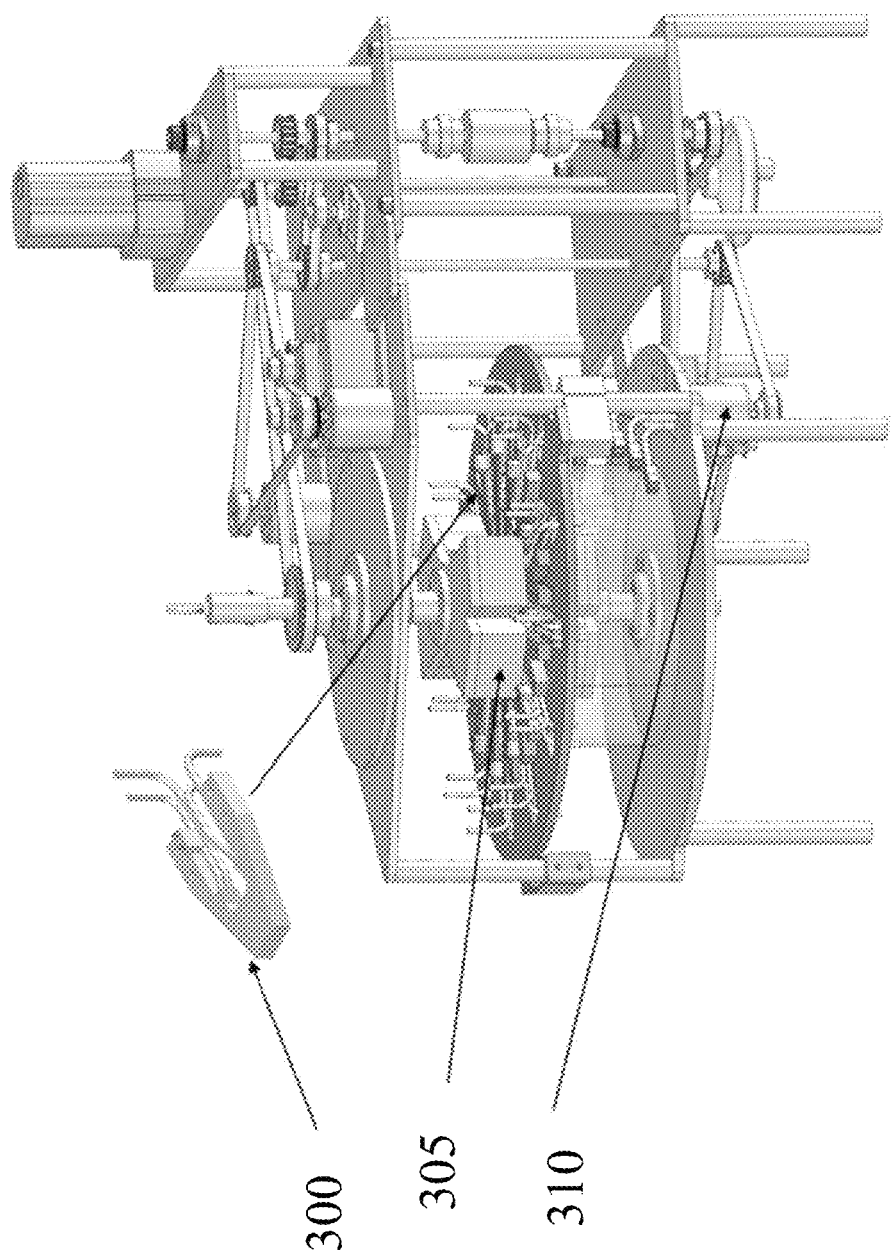
FIG. 3 is a diagram illustrating a rotating magnet active magnetic regenerator refrigerator in which the fluid flow is controlled by valves activated by the rotation of the magnet in accordance with an illustrative embodiment.

In another illustrative example, FIG. 3 demonstrates an AMR operation similar to FIG. 2 except where a magnet is rotated instead of MCM beds.

Figure 4:
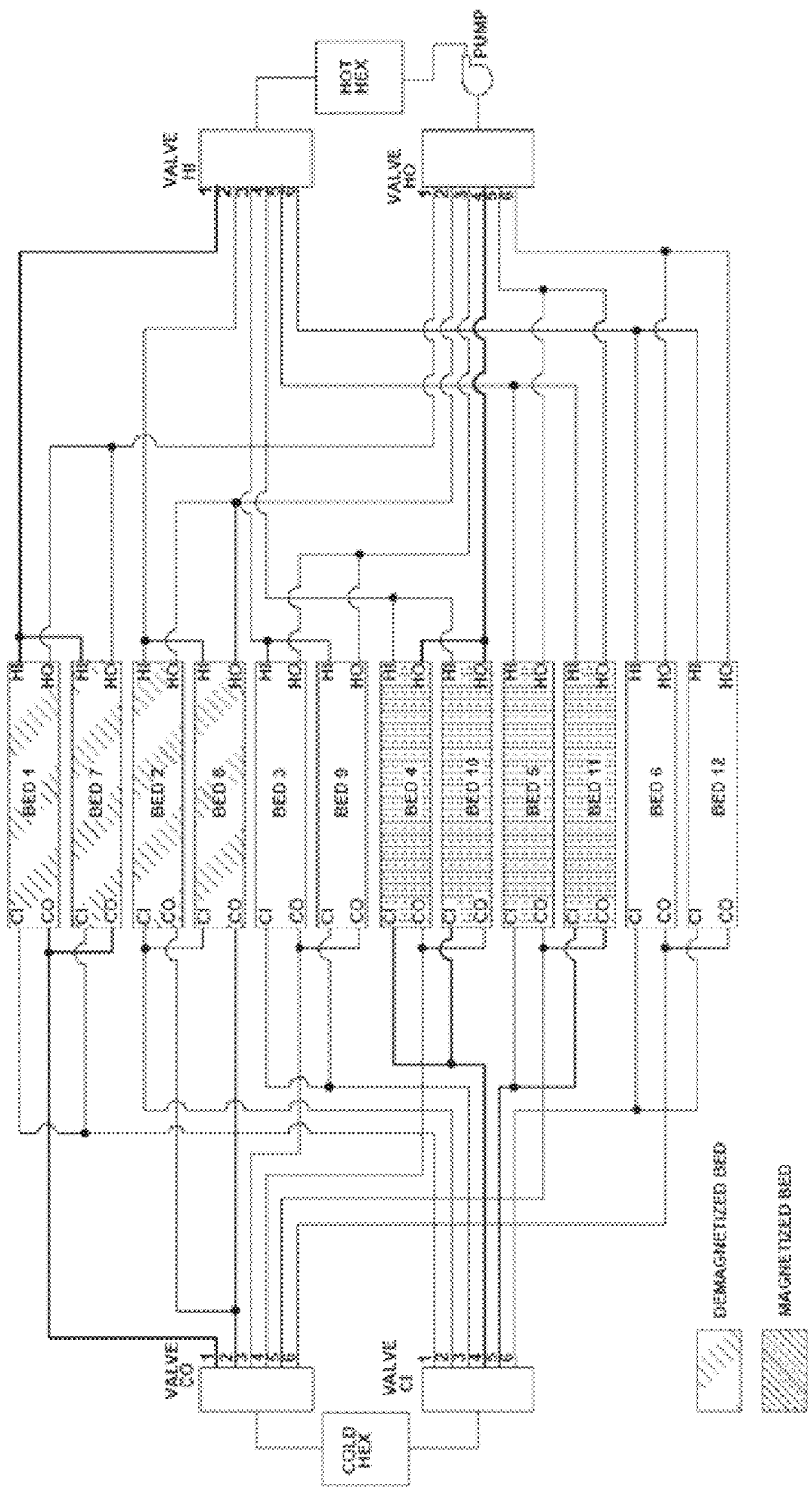
FIG. 4 is a diagram illustrating the flow circuit of a rotating magnet active magnetic regenerator refrigerator in which the fluid flow is controlled by valves activated by the rotation of the magnet in accordance with an illustrative embodiment.

FIG. 3 shows an MCM bed 300 that is in a fixed position. A magnet 305 rotates over the MCM bed 300 to heat and cool the MCM bed depending on the stage of the AMR cycle. The fluid flow through the MCM bed 300 is controlled by a rotary valve 310. FIG. 4 demonstrates how the valves and heat exchangers may be interconnected with various MCM beds in a device like FIG. 3.

The main work input to a magnetic refrigerator is the movement of the magnet or MCM beds against the magnetic forces to which they are subjected during the AMR cycle. For the rotating magnetic refrigerators discussed above, the main work input is utilized to rotate the wheel or magnet. Additional work input is utilized to drive the fluid flow.

The periodic reversal of flow though the beds in synchrony with the change in magnetic field is what enables the heat pumping ability of the AMR cycle. The flow from the cold-to-hot sides of a bed in the presence of the field drives heat to a HHEX, while the flow from the hot-to-cold sides of a bed in the absence of the field removes heat from a CHEX. See, for example, FIGS. 1a-1d, 5a, and 5b. The net effect of the AMR cycle is to consume work and drive heat from the CHEX to the HHEX.

Figure 5A:
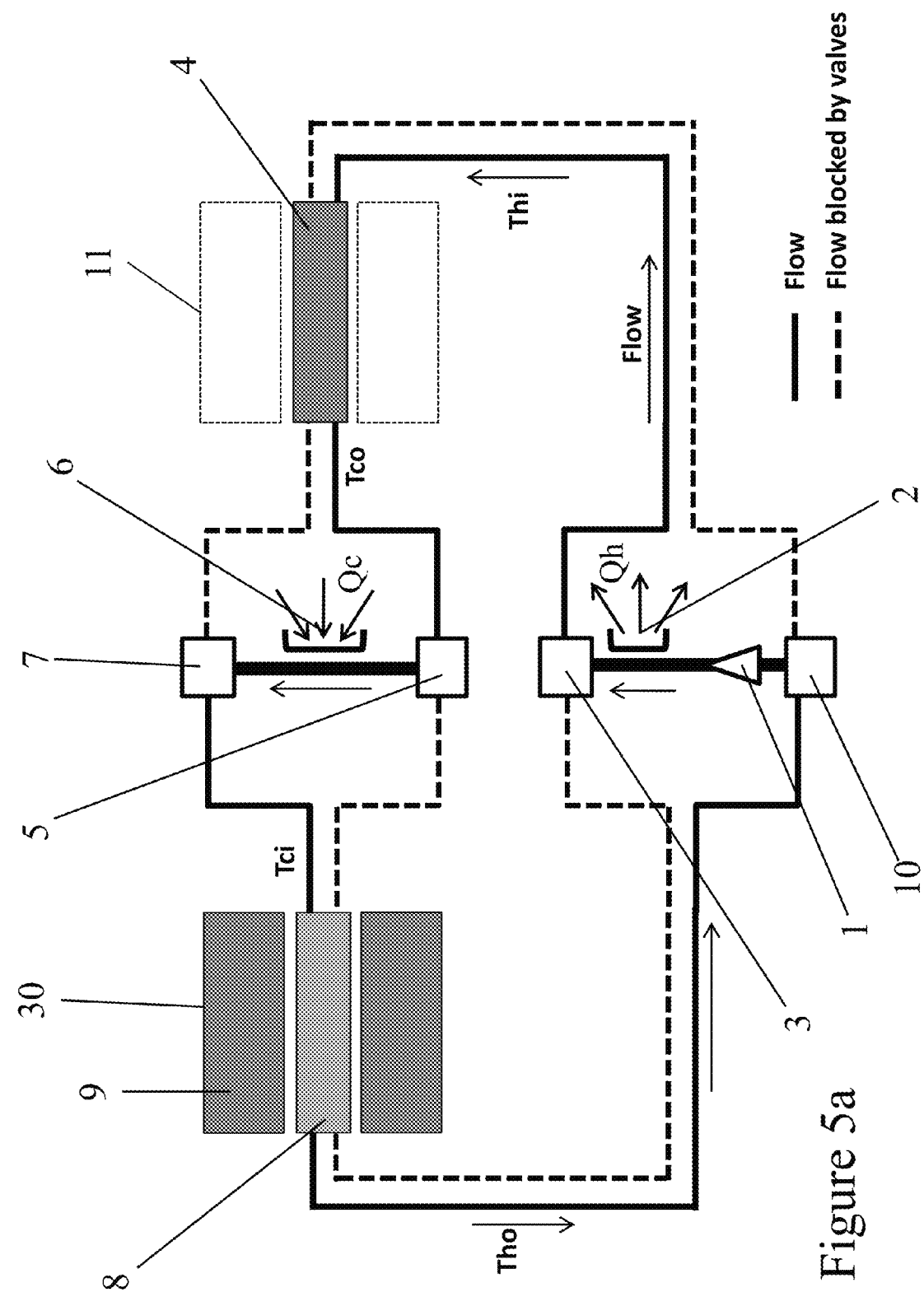
FIG. 5a is a diagram illustrating AMR mode operation in a magnetic refrigeration system with a magnet that is in periodic motion and in a first position in accordance with an illustrative embodiment.
Figure 5B:
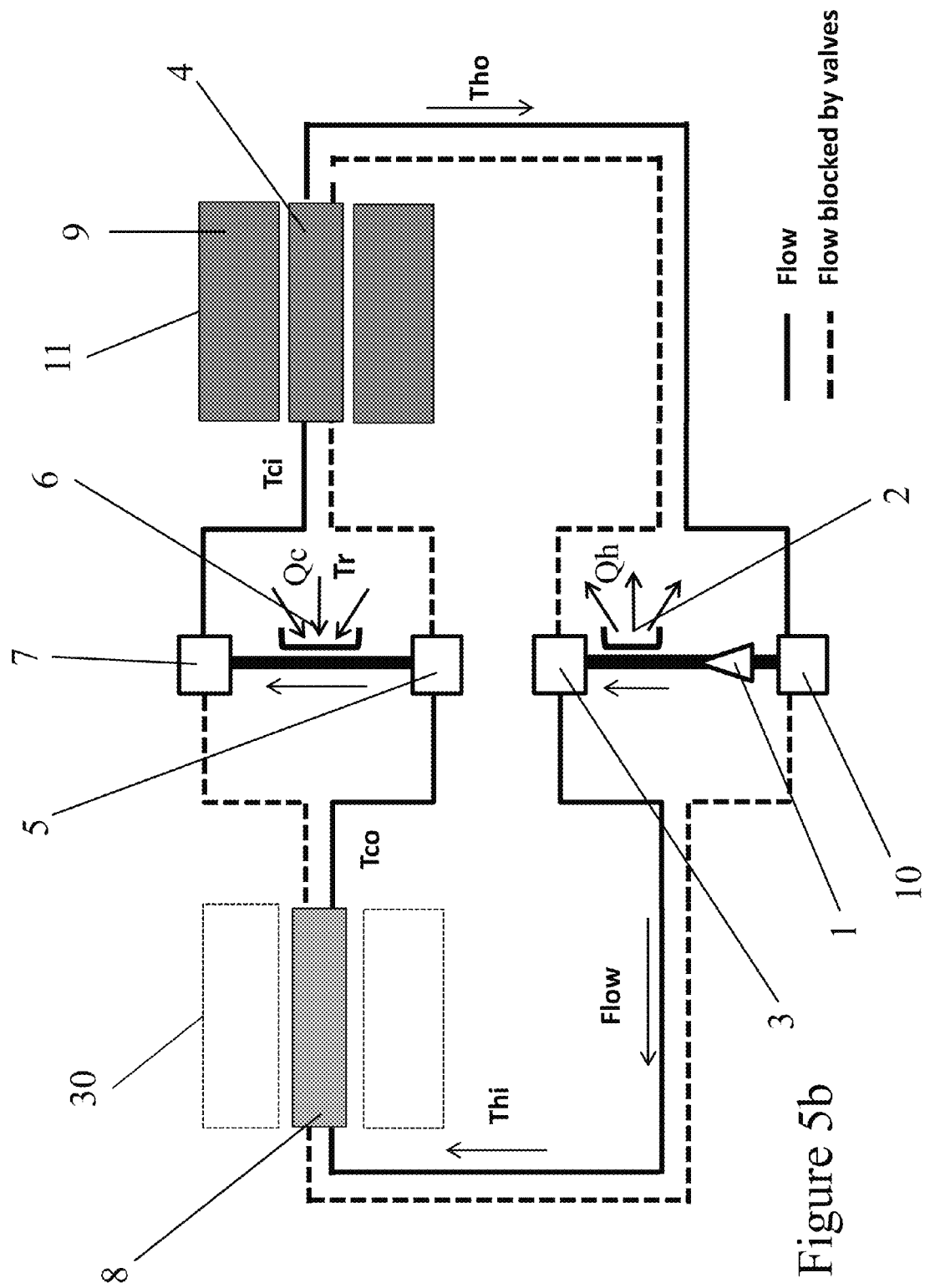
FIG. 5b is a diagram illustrating AMR mode operation in a magnetic refrigeration system with a magnet that is in periodic motion and in a second position in accordance with an illustrative embodiment.

FIGS. 5a and 5b show an illustrative embodiment of the AMR cycle. In a real device, the heat transfer fluid (HTF) will absorb or lose small amounts of heat while flowing through piping that connects the functional components of the device. In the illustrative embodiments of FIGS. 5a through 8b, the piping is well-insulated enough such that the small amounts of heat absorbed or lost in the piping does not significantly change the temperature of the fluid. In addition, the valves are well insulated and have low friction, such that fluid passing through the valves does not significantly change in temperature. It is also assumed in FIGS. 5a through 8b that the temperature of the MCM is near a paramagnetic to ferromagnetic transition, in which case the MCM will warm when a magnetic field is applied, and cool when the magnetic field is removed. It is also possible to use a MCM at a temperature near an antiferromagnetic transition, in which case the AMR cycle will operate in a similar manner, but the MCM will cool when a magnetic field is applied, and warm when the magnetic field is removed.

In FIG. 5a, a pump 1 drives heat transfer fluid (HTF) at a hot outlet temperature $T_{ho}$ through a hot side heat exchanger (HHEX) 2, where the HTF releases heat to an environment and cools to a hot inlet temperature $T_{hi}$. The HTF enters a hot inlet valve 3. The hot inlet valve 3 directs the HTF to the hot end of a porous bed of magnetocaloric material (MCM) 4 that is in a demagnetized state next to a position 11 outside a magnet 9. The HTF is cooled as it flows through the MCM bed 4 to a cold outlet temperature $T_{co}$ and is directed to a cold outlet valve 5. The cold outlet valve 5 directs the HTF through a cold side heat exchanger (CHEX) 6 where the HTF absorbs heat from the load, warming it to a cold inlet temperature $T_{ci}$. The fluid enters a cold inlet valve 7 and is directed to the cold end of a porous bed of MCM 8 that is inside the magnet 9 in a magnetized state. The MCM bed 8 is in a magnetized state next to a position 30, which is currently occupied by the magnet 9. The HTF is warmed as it flows through the MCM bed 8 to a temperature $T_{ho}$ and is directed to a hot outlet valve 10, completing a fluid cycle. After a period of time, $T_b$, the magnet 9 is removed from MCM bed 8 and the position 30 and moved over to MCM bed 4 and into the position 11, and the valves 10, 3, 5 and 7 are switched, producing the situation shown in FIG. 5b. Again, the pump 1 drives heat transfer fluid (HTF) at a temperature $T_{ho}$ through the HHEX 2, where the HTF releases heat to an environment and cools to a temperature $T_{hi}$. The HTF enters the hot inlet valve 3. The hot inlet valve 3 directs the HTF to the hot end of the MCM bed 8 that is in a demagnetized state next to the position 30 outside the magnet 9. The HTF is cooled as it flows through the MCM bed 8 to a temperature $T_{co}$ and is directed to the cold outlet valve 5. The cold outlet valve 5 directs the HTF though the CHEX 6 where the HTF absorbs heat from the load, warming it to a temperature $T_{ci}$. The HTF enters the cold inlet valve 7 and is directed to the cold end of the MCM bed 4 that is in a magnetized state inside the magnet 9, which is currently occupying the position 11. The HTF is warmed as it flows through the MCM bed 4 to a temperature $T_{ho}$ and is directed to the hot outlet valve 10, completing a fluid cycle. After a period of time $T_b$, the magnet 9 is again removed from the position 11 and the MCM bed 4 and returned to the position 30 and the MCM bed 8, and the valves 10, 3, 5 and 7 are switched, again producing the situation shown in FIG. 5a.

The two flow periods depicted in FIGS. 5a and 5b, together with the switching of the valves and the movement of the magnet 9 from the MCM bed 8 to the MCM bed 4, and back again to the MCM bed 8, constitute one AMR cycle. In an illustrative embodiment, conditions on the MCM, and the time $T_b$ are imposed. The condition on the MCM is that the MCM beds 4 and 8 may be constructed so the MCM at the cold end has a significant magnetocaloric effect at the temperature $T_{co}$ and the MCM at the hot end of the bed has a significant magnetocaloric effect at the $T_{ho}$, and intermediate layers of the MCM in the beds may have significant magnetocaloric effect at intermediate temperatures. The condition on the flow time $T_b$ is that it is short enough that the total heat capacity of the HTF that passes through the MCM bed 4 or the MCM bed 8 in the time $T_b$ is substantially less than the heat capacity of the MCM in either bed. For example, for the magnetic refrigeration machine described in S. Jacobs, J. Auringer, A. Boeder, J. Chell, L. Komorowski, J. Leonard, S. Russek, C. Zimm, The performance of a large-scale rotary magnetic refrigerator, International Journal of Refrigeration, available online 22 Sep. 2013, ISSN 0140-7007, http://dx.doi.org/10.1016/j.ijrefrig.2013.09.025, the entire disclosure of which is incorporated herein by reference, then $T_b$ should be less than 0.2 seconds.

When the desired temperature difference $T_{hi}$ and $T_{ci}$ is within the performance capabilities of the MCM and the device design, the operation of the magnetocaloric effect and the regeneration in the MCM beds 4 and 8 will allow $T_{co}$ to be less than $T_{ci}$ and $T_{ho}$ to be greater than $T_{hi}$, allowing the absorbing of a cooling load $Q_c$ in the CHEX 6 and the rejecting of a heat load $Q_h$ in the HHEX 2. The temperature difference $T_{hi}-T_{ci}$ is typically several times larger than Delta-$T_{ad}$, as described in Engelbrecht et al. Delta-$T_{ad}$ is the absolute value of the temperature change of the magnetocaloric material when the magnetic field is applied.

If the periodic reversal of the flow is suspended, but the flow is instead maintained in a single direction though the beds (unidirectional flow, UDF), the AMR cycle operation of the beds will cease, and hot fluid will be transferred from the HHEX 2 to the CHEX 6 through a bed that undergoes hot to cold flow, and cold fluid will be transferred from the CHEX 6 to the HHEX 2 through a bed that undergoes cold to hot flow. This is the opposite of the transfer of heat that is demonstrated in FIGS. 5a and 5b. In FIGS. 5a and 5b heat is transferred from the CHEX 6 to the HHEX 2, which cools the environment around the CHEX 6. In contrast, if the periodic reversal of flow is suspended (UDF mode), the heat will be transferred from the HHEX 2 to the CHEX 6. This may be useful for applications such as defrosting ice from the CHEX 6 in a freezer or refrigerator application. In this UDF mode, the periodic valve switching is suspended, causing the flow reversal of the HTF to cease, reducing the work needed to effectuate the UDF mode as compared to the AMR cycle.

Figure 6:
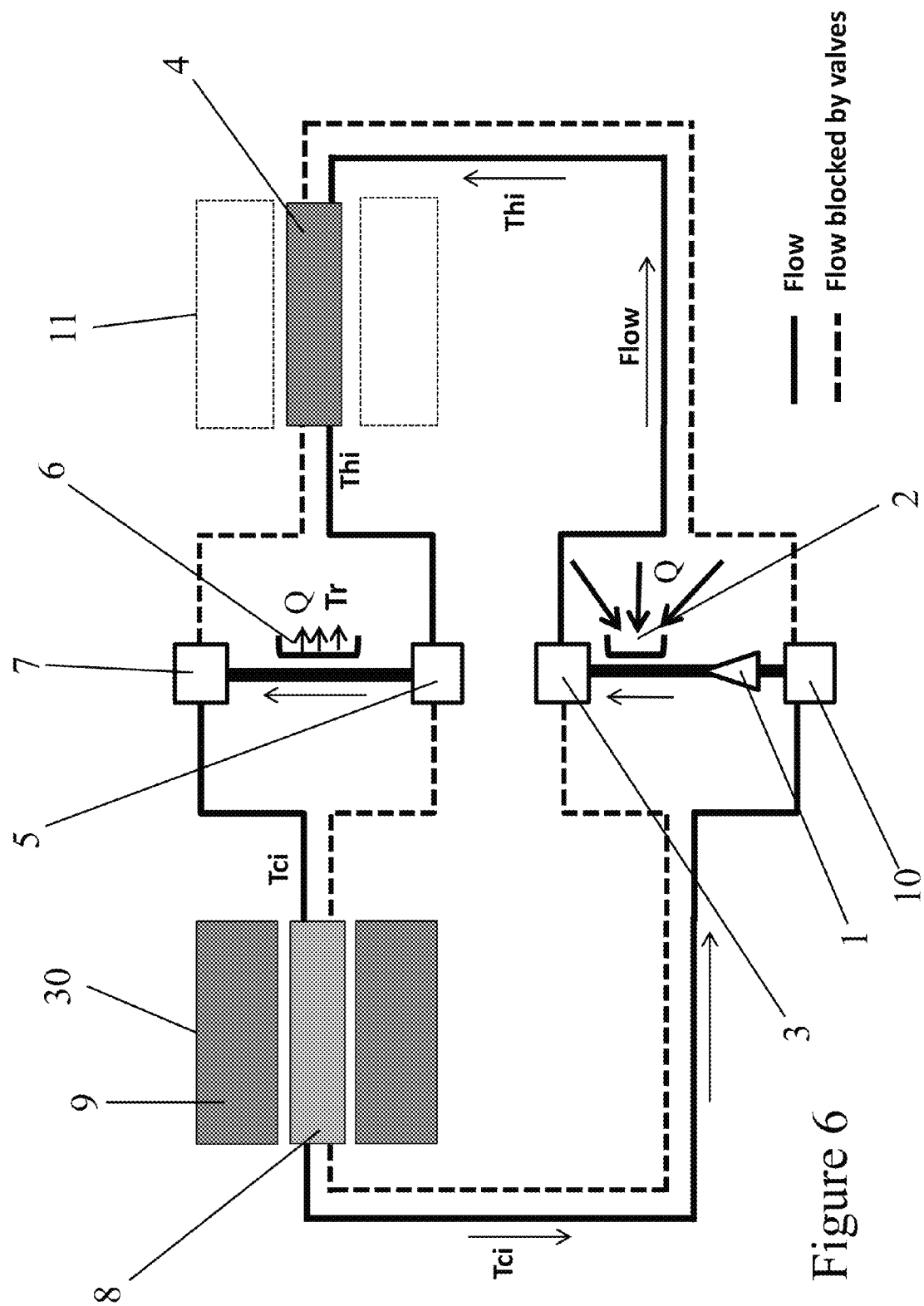
FIG. 6 is a diagram illustrating unidirectional flow (UDF) mode operation in a magnetic refrigeration system with a magnet that is stationary and valves that are left in fixed position in accordance with an illustrative embodiment.

FIG. 6 shows an illustrative embodiment of the operation of the UDF mode. The components shown are the same as those used in the illustrative embodiment of the AMR cycle in FIGS. 5a and 5b, but the periodic switching of the valves that was shown in FIGS. 5a and 5b is suspended, and the valves are instead left in fixed positions. The pump 1 drives heat transfer fluid (HTF) through the hot side heat exchanger (HHEX) 2 into the hot inlet valve 3. In this embodiment, the HTF absorbs heat in the HHEX 2 instead of exhausting heat as shown in FIGS. 5a and 5b. The hot inlet valve 3, left in the fixed position shown, directs the HTF to an end of the MCM bed 4 that is outside the magnet 9 in a demagnetized state next to the position 11. The HTF flows through the MCM bed 4 and is directed to the cold outlet valve 5. The cold outlet valve 5, left in the fixed position shown, directs the HTF through the CHEX 6. In this embodiment, the HTF fluid exhausts heat in the CHEX 6 instead of absorbing heat as shown in FIGS. 5a and 5b. This exhausted heat effectuates the defrost potential of the UDF mode. The fluid enters the cold inlet valve 7, left in the fixed position shown, and is directed to an end of the MCM bed 8 that is inside the magnet 9 in a magnetized state, since the magnet occupies the position 30 outside the MCM bed 8. The HTF flows through the MCM bed 8 and is directed to the hot outlet valve 10, left in the fixed position shown, completing a fluid cycle. The difference from the AMR cycle is that the flow is not periodically reversed within a time $T_b$ as discussed with reference to FIGS. 5a and 5b. After a short transient period, a few times longer than the maximum time $T_b$ discussed above, the regeneration action possible with the AMR cycle will cease, and any temperature differences between the ends of the MCM bed 4 will decay, and any temperature differences between the ends of the MCM bed 8 will also decay. For example, for the magnetic refrigeration machine described in S. Jacobs, J. Auringer, A. Boeder, J. Chell, L. Komorowski, J. Leonard, S. Russek, C. Zimm, The performance of a large-scale rotary magnetic refrigerator, International Journal of Refrigeration, available online 22 Sep. 2013, ISSN 0140-7007, http://dx.doi.org/10.1016/j.ijrefrig.2013.09.025, the entire disclosure of which is incorporated herein by reference, the short transient period may be about two seconds. In FIG. 6, there is an absence of temperature difference across the MCM bed 4, as the HTF in the inlet and outlet lines of MCM bed 4 have the same temperature, $T_{hi}$. There is also an absence of temperature difference across the MCM bed 8, as the HTF in the inlet and outlet lines of MCM bed 8 have the same temperature, $T_{ci}$. However, in alternative embodiments, the temperature in MCM beds 4 and 8 may not fully decay. In such a situation in which full decay does not occur, the HTF in the inlet and outlet lines of MCM bed 4 may not reach the same temperature. Similarly, the HTF in the inlet and outlet lines of MCM bed 8 may not reach the same temperature. The flow of heat from the HHEX 2 to the CHEX 6 will become substantial if the HHEX 2 and CHEX 6 are connected to significant heat reservoirs at differing temperatures $T_h$ and $T_c$, respectively (where $T_h$ and $T_c$ represent the hotter relative temperature of the HHEX 2 and the colder relative temperature of the CHEX 6, respectively). If $m_{dot}$ is the fluid mass flow rate, $C_f$ the fluid heat capacity, $T_c$ the temperature of the CHEX 6, $T_h$ the temperature of the HHEX 2, the heat transferred ($Q_{udf}$) while in UDF mode is approximately:

$$Q_{udf} = m_{dot} \times C_f \times (T_h - T_c). \tag{1}$$

This UDF mode heat transfer rate is larger than that carried by an AMR refrigerator in normal cooling mode. For instance, the AMR cooling power at a 14 Kelvin (K) span was 380 watts at a fluid flow rate of 8 liters per minute (LPM) as reported in S. Russek, J. Auringer, A. Boeder, J. Chell, S. Jacobs, C. Zimm, "The performance of a rotary magnet magnetic refrigerator with layered beds", published in the Proceedings of Fourth IIF-IIR International Conference on Magnetic Refrigeration at Room Temperature, Baotou, China, 23-28 Aug. 2010 (hereinafter "Russek et al."), the entire disclosure of which is incorporated herein by reference. The UDF heat transfer rate from equation 1 at the same span and flow rate is 7800 watts.

In many practical applications of refrigeration, it can be useful to suspend transport of heat from the CHEX to the HHEX for part of the time, and instead transfer heat from the HHEX to the CHEX. For example, the CHEX in a food storage refrigerator may normally operate below 0 C., the freezing point of water, in which case frost will accumulate on the CHEX, eventually interfering with its operation. One solution for this problem is to run a defrost cycle, during which the CHEX is heated above 0 C. to melt the accumulated frost. A conventional defrost cycle for household refrigerators suspends the operation of the refrigeration cycle, and electrically heats the CHEX. A disadvantage of this approach is that if X joules of energy is used to melt the accumulated ice, at least X joules of electrical energy must be supplied. A more efficient alternative is to transfer heat from the HHEX to the CHEX using the UDF mode, because the power consumed would be that used to pump the fluid. In an illustrative case of Russek et al. discussed in the previous paragraph, the pressure drop in the fluid path at 8 LPM was 380 kilopascals (kPa), and the power consumed to drive the flow, assuming 40% pump efficiency, was 130 watts. The UDF heat transfer rate noted above of 7800 watts, which is the heat furnished to the CHEX, is 60 times greater than the work input used to drive the flow.

In some refrigerators, a fan blows air over the CHEX in order to assist heat transfer from the CHEX to the refrigerated compartment during the normal refrigeration cycle. In other words, when the CHEX is cooling or absorbing heat from its environment, a fan may be used to make the process more efficient or uniform. In such cases, during UDF defrost mode, the operation of the fan may be suspended in order to minimize the amount of heat transferred into the refrigerated compartment during the defrost mode, while still taking advantage of the significant heat transfer to the CHEX itself to melt the ice that has accumulated on it.

The timing of the defrost mode may be controlled using multiple methods. Conventional refrigerators often switch on and off multiple times per day to maintain the refrigerated space temperature. The proportion of time that the refrigerator is on is called the duty cycle of the refrigerator. One method to control the defrost mode would be to periodically switch the refrigerator into defrost mode for a fixed proportion of the duty cycle time, which might be accomplished with a timing mechanism. For example, the defrost mode might be performed once per day, and the fixed proportion of time for defrost could be 3-10% of the total operating time of the magnetic refrigeration system for that day. Another approach, using the arrangement of FIG. 6, would be to switch between AMR and defrost mode using measured temperatures. The temperature $T_{ci}$ of the HTF emerging from the CHEX 6, and the temperature $T_r$ of the refrigerated space around the CHEX 6, would be monitored. When the difference $T_r - T_{ci}$ reaches a first threshold value, indicating the presence of excessive ice that blocks heat from entering the CHEX 6 from the refrigerated space, the defrost mode is turned on. When the temperature $T_{ci}$ reaches a second threshold value above the freezing point of water, indicating that most of the ice has melted off the CHEX 6, the defrost mode is turned off. The first threshold value might be 7 C., and the second threshold value might be 3 C.

Another example where UDF mode may be useful is in building cooling when the outdoor temperature is highly variable. Buildings may have large internal heat generation sources such as electrical equipment, and thus require transport of heat to the outdoors at all times. When the outdoor temperature is above the desired internal building temperature (set point), AMR cooling can be used to transport the heat from one or more HEX's interior to the building to one or more HEX's exterior to the building via fluid flow. However, when the outdoor temperature drops substantially below the set point, which can happen at night or during winter, the AMR cycle may not be used. UDF mode is a desirable way to transport the heat from interior HEX's to exterior HEX's by fluid flow, with greatly reduced work input. Since no phase change occurs in the heat transfer fluid for the AMR cycle, the same heat exchangers and fluid loop may be used for both normal cooling and the UDF mode. With a conventional vapor cycle system, an auxiliary fluid loop and single phase heat exchangers may be required because the phase changes that occur in the normal cooling mode may not occur at the correct temperatures when the outdoor temperature is low.

The UDF mode as described above involves unidirectional flow through the AMR beds themselves and through a CHEX and HHEX. An alternative that would function with similar heat transfer would be to use unidirectional flow connecting the CHEX to the HHEX, and bypassing the beds. Direct connection that bypasses the AMR beds, such as that shown in FIGS. 7a and 7b, would reduce the flow work required, because there would be no pressure drop from flow through the porous beds. In some cases, arrangements for bypassing the AMR beds could have the disadvantage of greater flow circuit complexity. For example, the valves 3, 5, 7 and 10 in FIG. 6 for the configuration using UDF flow through the beds 4 and 8 are 2-way valves, but the valves 40, 45, 50 and 55 in FIG. 7 for the configuration using flow that bypasses the beds 4 and 8 are more complex 3-way valves.

Figure 7A:
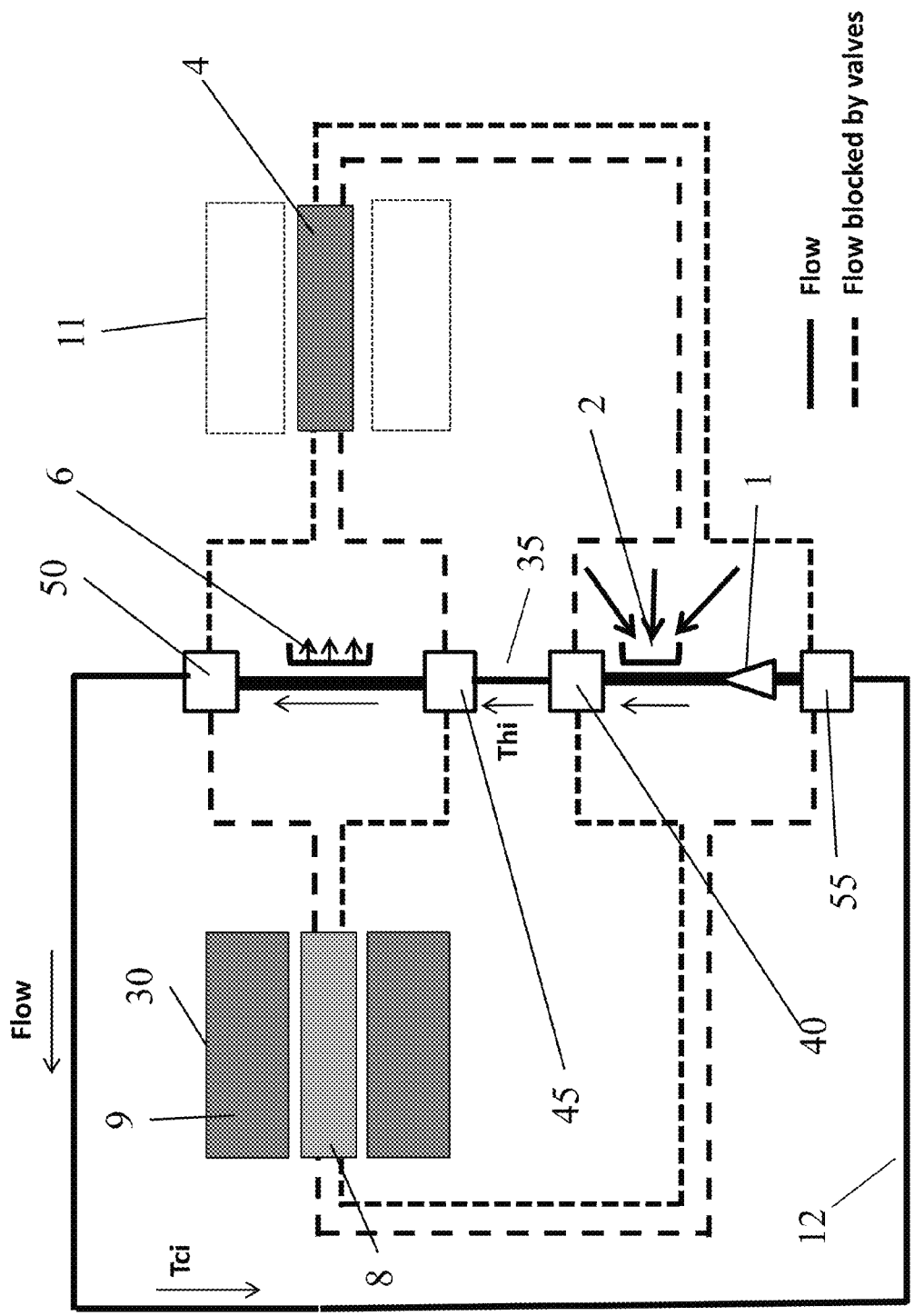
FIG. 7a is a diagram illustrating unidirectional flow (UDF) mode operation in a magnetic refrigeration system with the AMR beds bypassed in accordance with an illustrative embodiment.
Figure 7B:
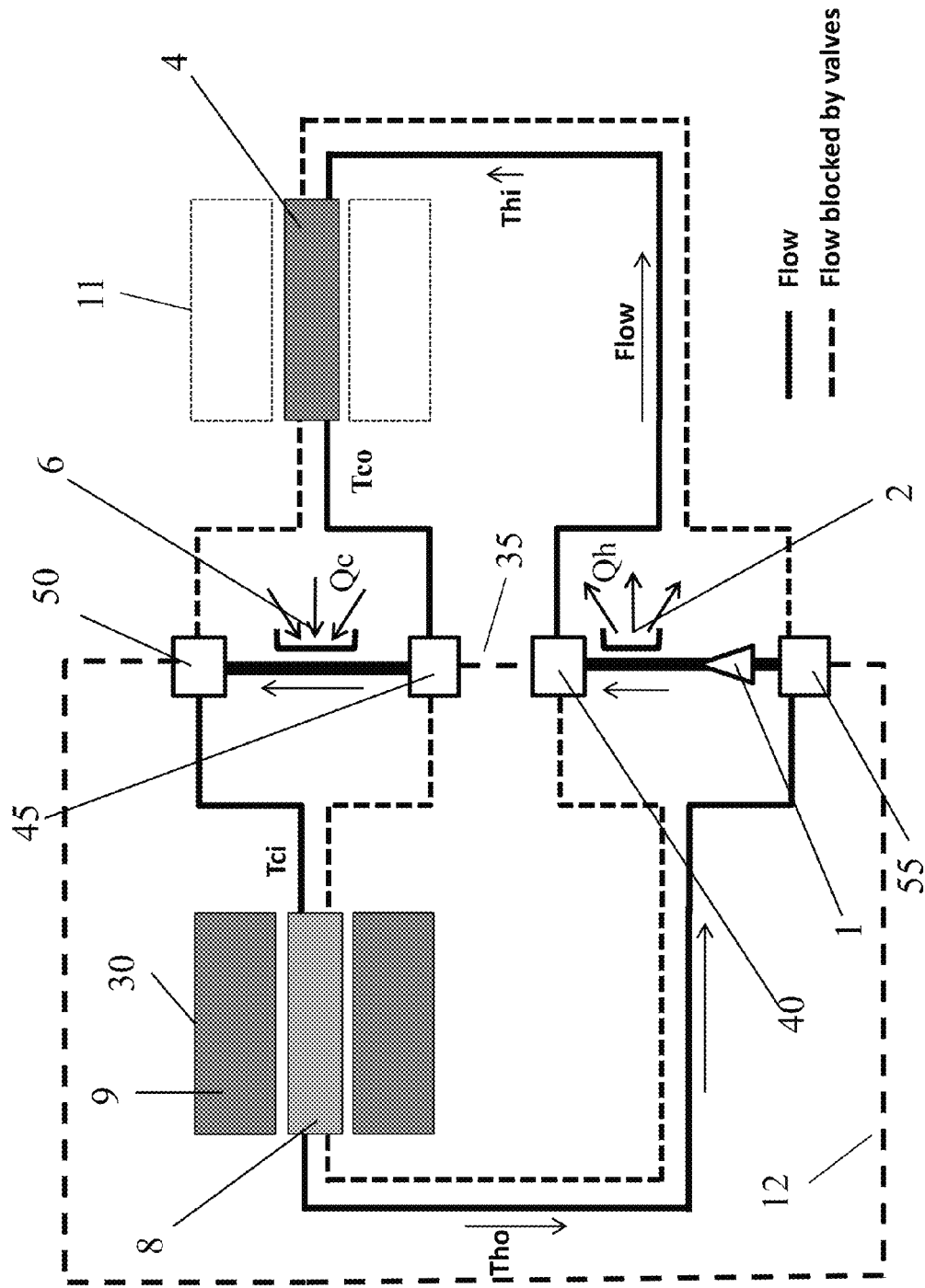
FIG. 7b is a diagram illustrating Uni-directional Flow (UDF) mode operation in a magnetic refrigeration system with an AMR bed bypass with a magnet that is in periodic motion and in a first position in accordance with an illustrative embodiment.
Figure 7C:
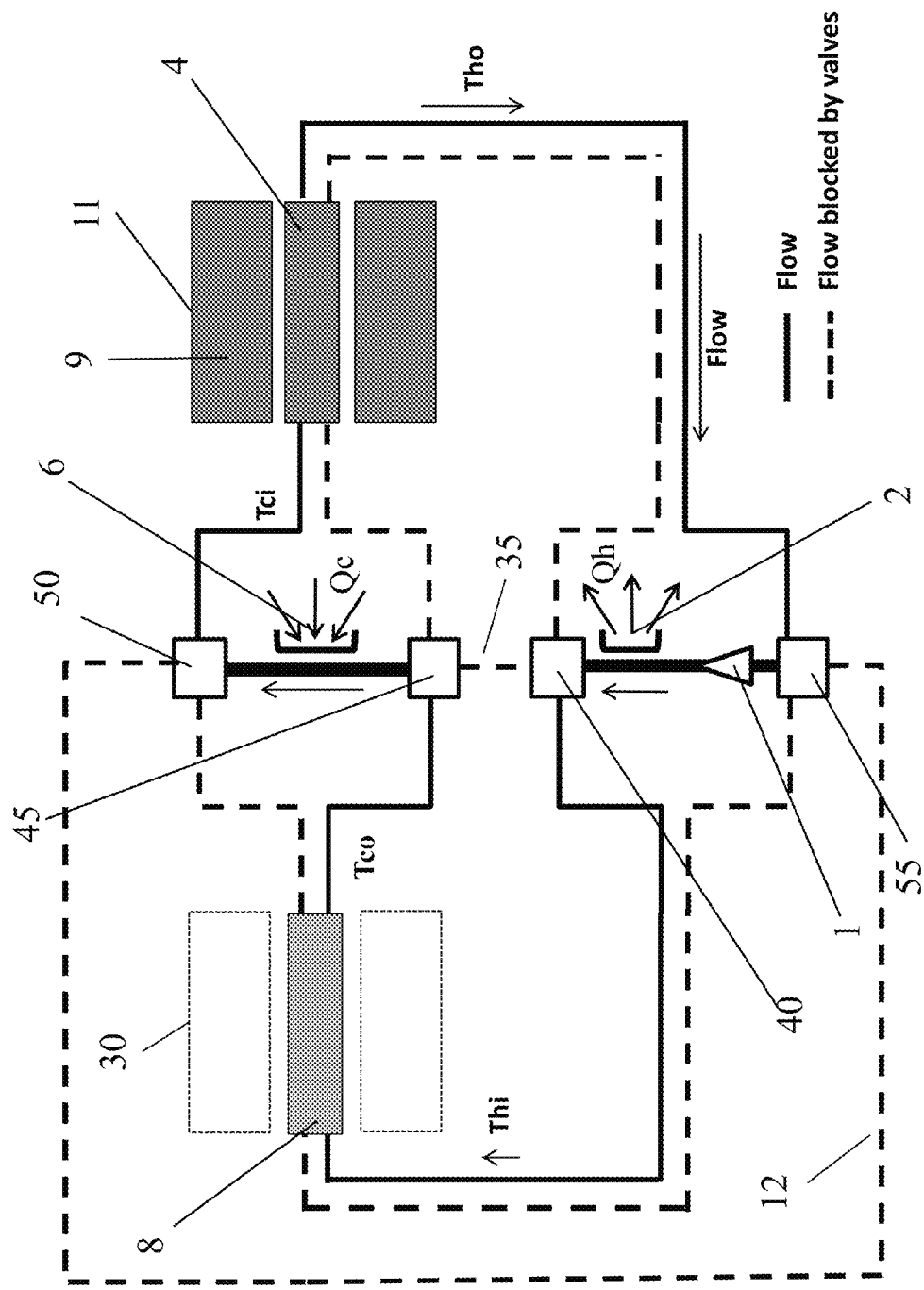
FIG. 7c is a diagram illustrating unidirectional flow (UDF) mode operation in a magnetic refrigeration system with an AMR bed bypass with a magnet that is in periodic motion and in a second position in accordance with an illustrative embodiment.

In FIGS. 7a and 7b, the UDF with bypass mode, and the AMR mode is shown in an illustrative embodiment. The components in FIGS. 7a and 7b are the same as those used in the illustrative embodiment of the AMR cycle in FIGS. 5a and 5b, except for the valves. Each of the valves shown in FIGS. 7a and 7b have three possible flow settings instead of the two possible flow settings for the valves shown in FIGS. 5a and 5b. Another embodiment, not shown here, may use a set of multiple valves each with two possible settings to substitute for each valve with three possible flow settings to achieve similar aspects of FIGS. 7a and 7b. In FIG. 7a, the UDF mode with valves in a bypass arrangement is shown. Heat transfer fluid (HTF) from the pump 1 flows through the hot side heat exchanger HHEX 2, and enters a hot inlet valve 40 and is directed through a bypass pipe 35 to a cold outlet valve 45. The HTF flows through the CHEX 6 and to a cold inlet valve 50, where the HTF is directed through a bypass pipe 12 to a hot outlet valve 55 and to the pump 1. The HTF does not flow though the MCM beds 4 and 8 during the UDF bypass mode. The magnet 9 may be left in fixed position, or can be reciprocated between the MCM beds 4 and 8. When AMR operation is desired instead of UDF mode, FIGS. 7b and 7c, the valves 40, 45, 50, and 55 switch so that HTF flows to the bypass pipes 35 and 12 are blocked, and flow is instead directed in a manner identical to that shown in FIGS. 5a and 5b. In the AMR mode shown in FIGS. 7b and 7c, the magnet 9 is reciprocated between the MCM beds 4 and 8. One magnet position is shown in each of the FIGS. 7b and 7c, where the magnet occupies either the position 30 (as in FIG. 7b) or the position 11 (as in FIG. 7c).

The changing magnetic field used during the AMR cycle is not used during the UDF mode. It thus may be helpful to suspend the time varying magnetic field. If the magnetic field comes from a permanent magnet, the suspension of the time varying magnetic field may be done by suspending the relative motion between the magnet and beds. If the magnetic field comes from an electromagnet, the suspension of the time varying magnetic field may be done by suspending the relative motion between the magnet and beds, or by suspending the energizing of the electromagnet. The changing magnetic field for the AMR cycle may be produced by relative motion between the magnet and magnetocaloric beds. Because beds subjected to UDF from hot to cold may be mostly hot, and thus of fairly low magnetic permeability, and beds subjected to UDF from cold to hot may be mostly cold and thus of relatively high magnetic permeability, relative motion between the magnet and beds when there is a large temperature span will involve movement against varying magnetic forces, which may require energy input. Thus, it may be advantageous to suspend the relative motion between the magnet and beds. For magnetic refrigerators in which either the bed wheel or magnet rotate, such as the embodiments shown in FIGS. 2, 3 and 4, the reversal of flow can be done with a rotating valve coupled to the rotation that produces relative motion between the magnet and beds. In these cases, if the pump has a separate drive mechanism, the change from AMR to UDF mode may be accomplished by stopping the rotation of the wheel or magnet, which stops both the changing of the magnetic field, and reversal of flow. The fluid flow is maintained, but in a single direction, if the enhanced heat transfer of the UDF is to be achieved.

The UDF mode may also be useful in multi-stage cooling applications. One example would be a combination refrigerator-freezer, which has one refrigerator compartment for fresh food that is maintained slightly above 0 C., and another freezer compartment for frozen food, which is maintained below 0 C. The normal cooling operation of this appliance could be obtained using a single stage AMR that directly cools the freezer compartment, and maintains the temperature of the refrigerator compartment by selectively introducing cold air from the freezer compartment. Such a one stage device could defrost a CHEX using the UDF mode described above. However, as shown in an illustrative embodiment in FIGS. 8a and 8b, the use of two AMR fluid circuits, an AMR circuit 120 and an AMR circuit 185, a cold side heat exchanger (CHEX) 95, a cold side heat exchanger (CHEX) 155, a hot side heat exchanger (HHEX) 65, a fluid to fluid interstage heat exchanger (HEX) 90, a pump 60, and a pump 130 would allow the use of a nearly pure water mixture on the refrigeration portion of the AMR circuit 120, with a viscous antifreeze mixture used for the sub 0 C. freezer loop of the AMR circuit 185, reducing pump work. For example, the refrigerator portion 120 could use a solution of 10% ethylene glycol in water, with a viscosity of about $2.5 \times 10^{-3}$ kg/(m-s) at 0 C., and the freezer portion 185 could use solution of 40% ethylene glycol in water, with a viscosity of about $5.3 \times 10^{-3}$ kg/(m-s) at 0 C. The freezer circuit can have the air-fluid CHEX 155 on the cold side at around −20 C., and the fluid to fluid interstage HEX 90 at the warm end at slightly above 0 C. The fresh food AMR circuit 120 can have the air-fluid CHEX 95 at the cold outlet of the AMR circuit 120 at around 0 C. for cooling the fresh food compartment, and also can connect to the fluid-fluid HEX 90 to pick up the heat from the freezer AMR circuit 185. The fresh food AMR circuit 120 exhausts heat to ambient air outside the appliance via the HHEX 65. During the operation of the AMR cycle, a magnet 115 cycles between porous MCM beds 105 (next to a position 110) and 75 (next to a position 80) of the fresh food AMR circuit 120, and a magnet 175 cycles between the porous MCM beds 165 (next to a position 170) and 140 (next to a position 150) of the freezer loop AMR circuit 185 (as demonstrated in FIGS. 8a and 8b). During the operation of the AMR cycle, the valves 125, 70, 85, 100, 135, 180, 145, and 160 also periodically switch to produce the flows shown in FIGS. 8a and 8b.

Figure 8A:
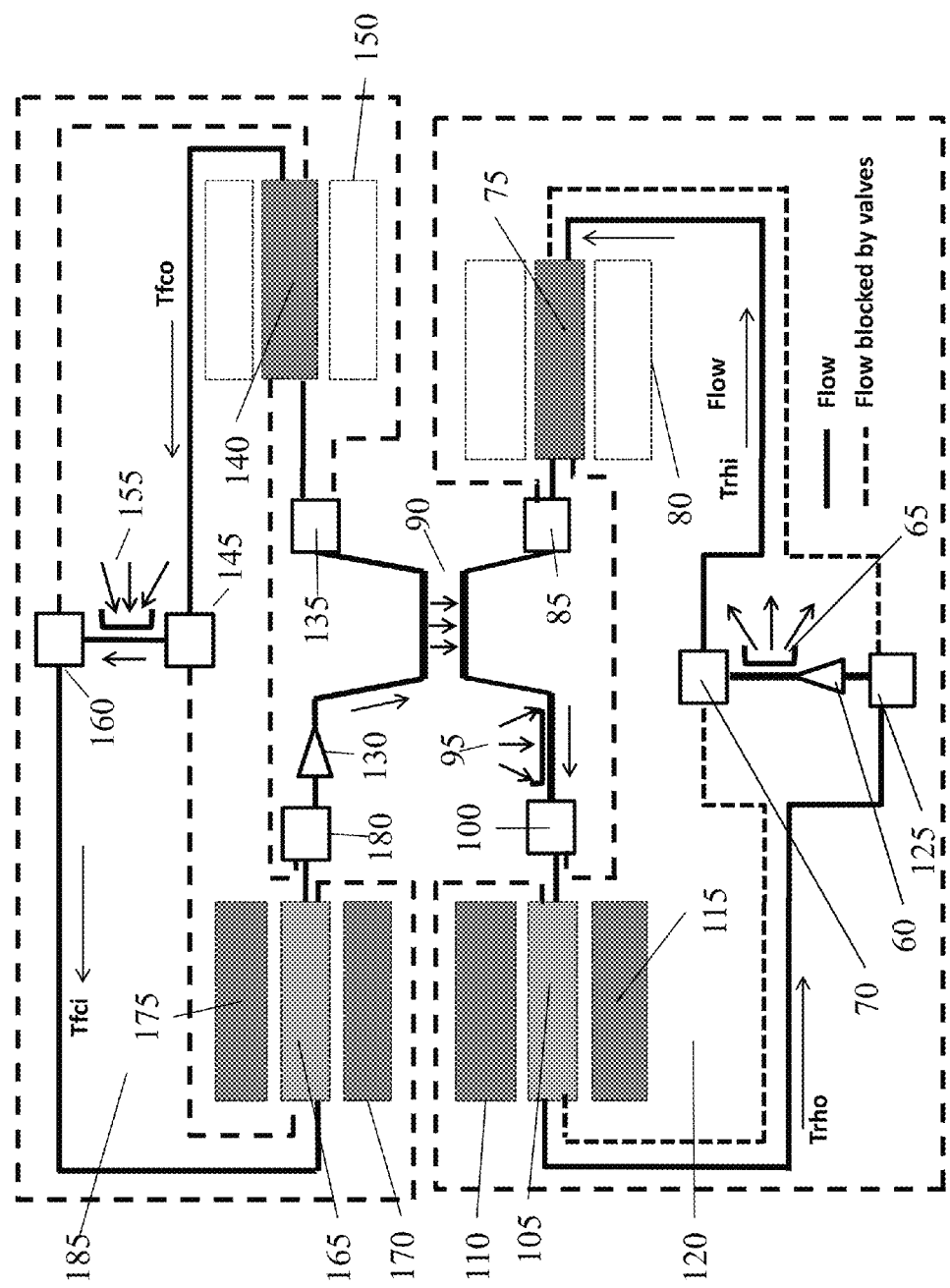
FIG. 8a is a diagram illustrating a two compartment refrigerator-freezer with cooling provided by a magnetic refrigeration system with a magnet that is in periodic motion and in a first position in accordance with an illustrative embodiment.
Figure 8B:
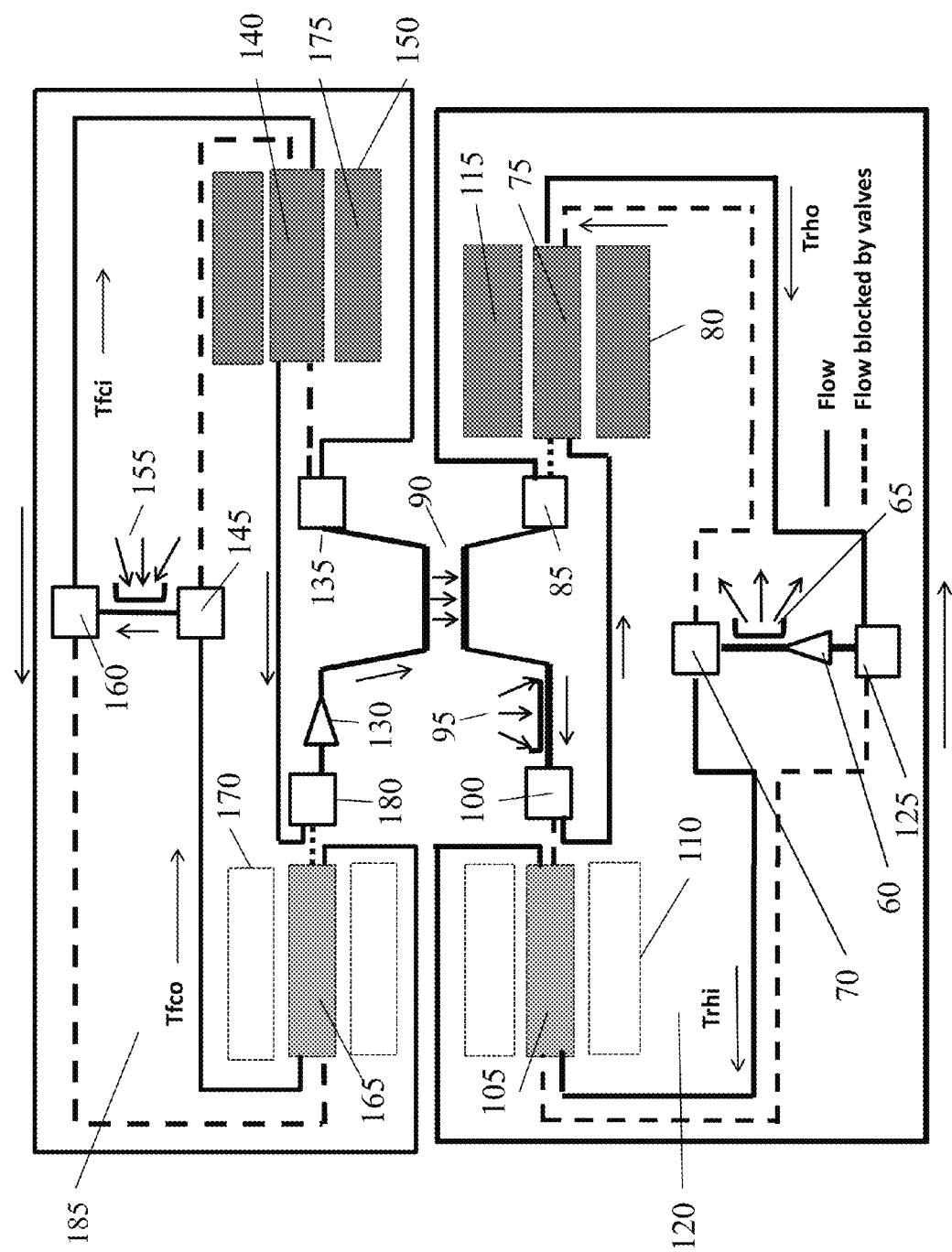
FIG. 8b is a diagram illustrating a two compartment refrigerator-freezer with cooling provided by a magnetic refrigeration system with a magnet that is in periodic motion and in a second position in accordance with an illustrative embodiment.
Figure 9:
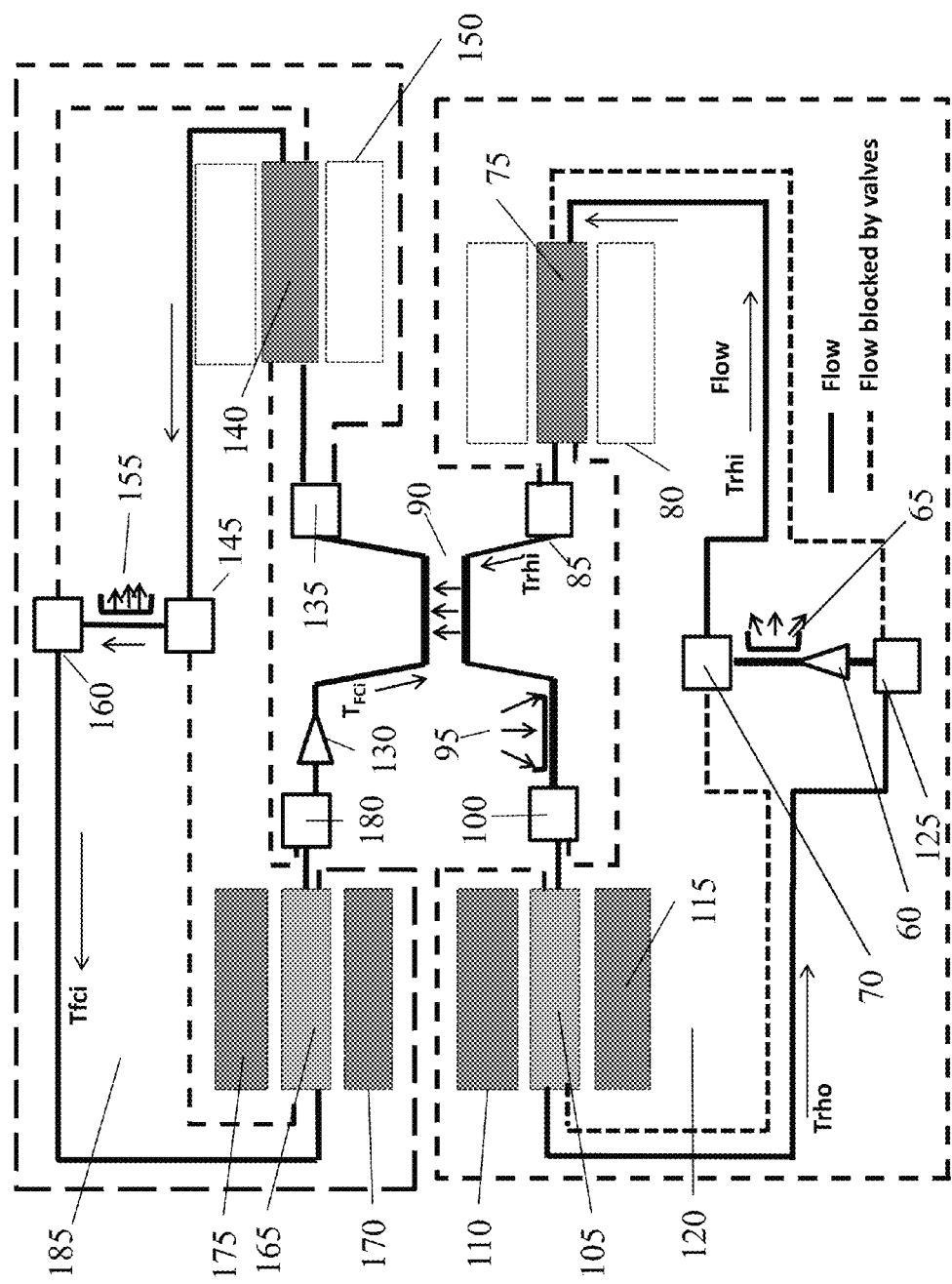
FIG. 9 is a diagram illustrating unidirectional flow (UDF) mode operation in the freezer circuit of a two compartment refrigerator-freezer with cooling provided by a magnetic refrigeration system, with the magnet for the freezer circuit stationary in accordance with an illustrative embodiment.

The illustrative embodiment shown in FIGS. 8a and 8b can also be used in different UDF modes. One example of the system in FIGS. 8a and 8b using UDF mode is demonstrated in FIG. 9. During a defrost cycle for the freezer AMR circuit 185, the fresh food stage AMR circuit 120 could continue to run normally with periodic switching of the valves 70, 85, 100 and 125 to produce reversal of the fluid flow direction in the MCM beds 75 and 105, and continued movement of the magnet 115 between the position 110 next to the MCM bed 105 and the position 80 next to the MCM bed 75. The switching of the valves 135, 145, 160 and 180 is suspended, changing fluid flow in the freezer AMR circuit 185 to UDF mode, shorting out the freezer AMR cycle, so heat is moved from the fluid-fluid interstage HEX 90 coupled to the fresh food fluid loop AMR circuit 120 to the freezer CHEX 155 to melt the frost, using heat from the fresh food loop AMR circuit 120 plus the flow work from the freezer stage pump 130. The temperature of the fluid returning to the cold side of the fresh food loop AMR magnetized MCM bed 105 is slightly colder than the fluid leaving the cold side of the fresh food demagnetized MCM bed 75, so the work input to the fresh food stage AMR circuit 120 becomes very small during the defrost mode of AMR circuit 185.

Figure 10:
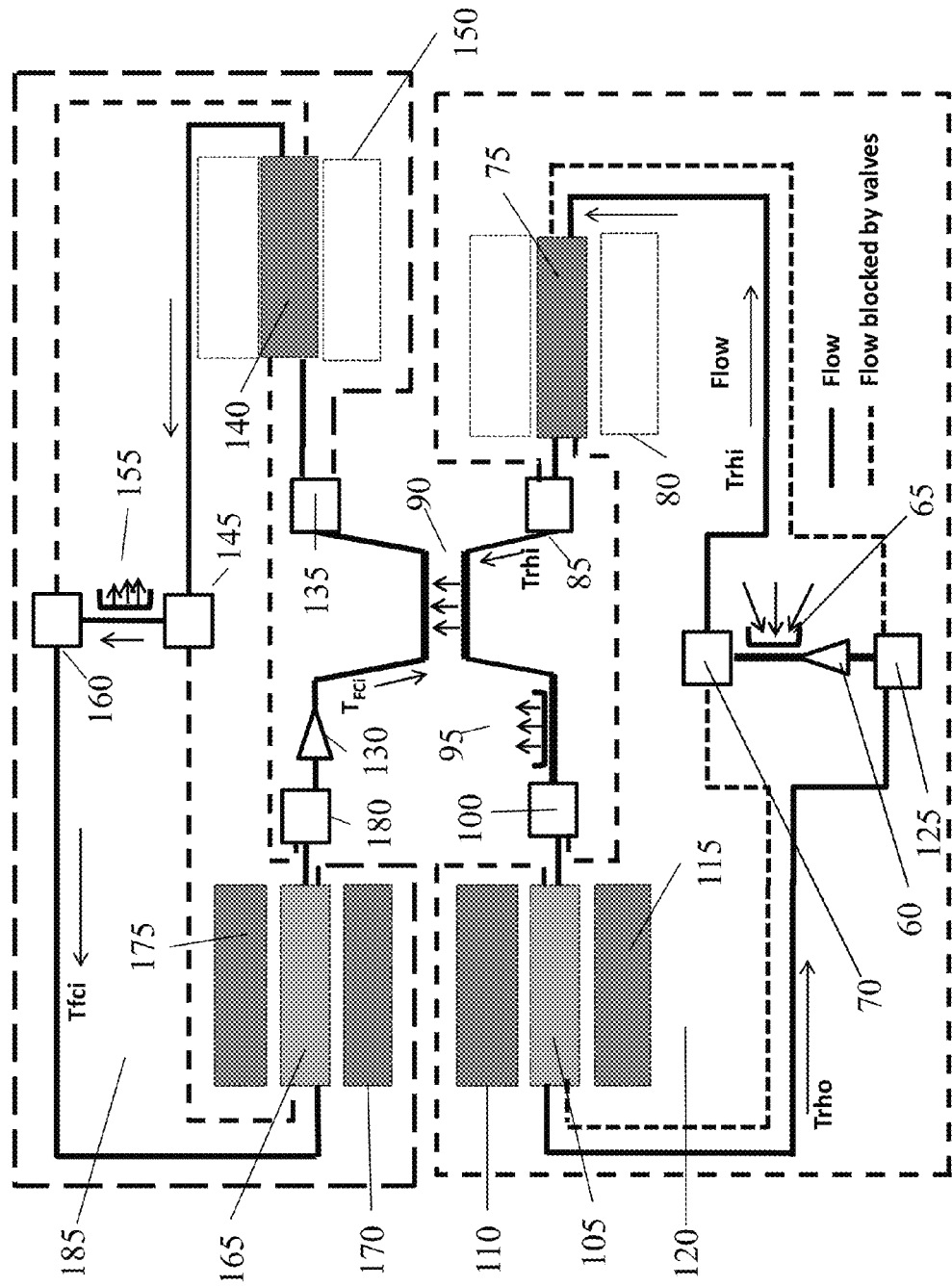
FIG. 10 is a diagram illustrating unidirectional flow (UDF) mode operation in both circuits of a two compartment refrigerator-freezer with cooling provided by a magnetic refrigeration system, with magnets that are stationary in accordance with an illustrative embodiment.

If a greater heating rate is desired to defrost the freezer CHEX 155, or the fresh food CHEX 95 is to be defrosted, the fresh food AMR circuit 120 could also be put in UDF mode. An embodiment demonstrating the AMR circuit 185 and the AMR circuit 120 both being in UDF mode is shown in FIG. 10. An overall benefit of using the UDF mode would be much lower power consumption during the defrosting time than that used for a conventional electric heat defrost.

Suspension of the AMR operation by turning off fluid flow may be sufficient to transfer heat from a HHEX to a CHEX. In this case, static conduction will be available to transfer heat between the HHEX and CHEX. However, this static conduction heat transfer through porous beds of magnetocaloric material may be very small. Thus, fluid flow may be utilized to transport significant amounts of heat between the heat exchangers. One embodiment of this is through the use of UDF.

If the periodic cycling of the magnetic field of the AMR is halted, for example, by halting the wheel or magnet motion, but the fluid flow in the beds with periodic reversal is continued, the refrigeration effect of transporting heat from the CHEX to the HHEX will cease, and heat will instead flow from the HHEX to the CHEX. If the reversal is often enough so that the heat capacity of the fluid that flows through each bed during a half cycle is less than the heat capacity of the bed packing material, and the flow is slow enough to allow efficient heat transfer between the fluid and the bed packing material, which are the typical conditions under which an AMR is operated, then the beds will act as conventional thermal regenerators (Frank W. Schmidt and A. John Willmott, Thermal Energy Storage and Regeneration, McGraw-Hill Inc., (1981)) (incorporated herein by reference in its entirety), alternately storing and releasing heat. Again, the amount of heat transferred from the hot side to the cold side of the AMR under these conditions will be relatively small. Thus, in order to transfer a significant amount of heat, not only is flow utilized, but the flow reversal of normal AMR operation is also suspended. This unidirectional flow mode of operation allows the transport of substantial amounts of heat from what is normally a HHEX to what is normally a CHEX of an AMR magnetic refrigerator.

Running a magnetic refrigerator in reverse, with flow from the HHEX through the magnetized bed(s) to the CHEX, and from the CHEX through the demagnetized bed(s) to the HHEX, may also efficiently defrost the CHEX. However, when applied to an AMR refrigerator, the heat rate transferred would be about the same as the cooling power of the refrigerator, which is much less than that which can be transferred via the UDF mode. This is because running the magnetic refrigerator in reverse maintains the reciprocating flow and regeneration, so the heating applied to the CHEX is:

$$Q_{rev} <= m_{dot} \times C_f \times \text{Delta-}T_{ad} \qquad (2),$$

while the heat applied via the UDF mode is:

$$Q_{udf} = m_{dot} \times C_f \times (T_h - T_c). \qquad (3)$$

For a typical AMR magnetic refrigerator:

$$T_h - T_c >> \text{Delta-}T_{ad} \qquad (4)$$

Where Delta-$T_{ad}$ is the absolute value of the temperature change of the magnetocaloric material when the magnetic field is applied, $M_{dot}$ is the fluid mass flow rate, $C_f$ is the fluid heat capacity, $T_o$ is the temperature of a CHEX, $T_h$ is the temperature of a HHEX, $Q_{rev}$ is the heat transferred when running the refrigerator in reverse, and $Q_{udf}$ is the heat transferred in the UDF mode.

In an illustrative embodiment, all of the aforementioned embodiments and modes may be accomplished through use of a controller. Such a controller may be an electro-mechanical device that is constructed to turn valves on and off and to move magnets or MCM beds in a timed sequence based on the construction and calibration of the refrigeration system. Another variation of controller may include an electronic device, which may include integrated circuits and/or a computing device that controls various electrically controlled valves, pumps, motors, and magnets. Using computer readable instructions, the computing device may provide control signals to the components of the refrigeration device in order to carry out the functions of the various embodiments discussed herein. Such a controller may send electrical signals in order to turn on and off valves, turn on various pumps, motors, and magnets, turn off various pumps, motors, and magnets, or adjust speeds or settings of various pumps, motors or magnets.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A dual-mode magnetic refrigeration apparatus, comprising:
   one or more beds of magnetocaloric material;
   a magnet to apply a time-varying magnetic field to the one or more beds of magnetocaloric material;
   a heat transfer fluid;
   a pump to circulate the heat transfer fluid;
   a hot side heat exchanger (HHEX);
   a cold side heat exchanger (CHEX);
   one or more valves to direct flow of the heat transfer fluid; and
   a controller configured to control periodic switching of the one or more valves to allow the apparatus to operate in a first mode and in a second mode, wherein in the first mode the one or more valves direct the heat transfer fluid to a cold end of the one or more beds through the one or more beds to a hot end of the one or more beds and through HHEX when the time-varying magnetic field applied to the one or more beds is high, and to the hot end of the one or more beds through the one or more beds to the cold end of the one or more beds and through the CHEX when the time-varying magnetic field applied to the one or more beds is low, in order to transfer heat from the CHEX to the HHEX; and
   wherein in the second mode of operation, the periodic switching of the one or more valves is suspended to allow unidirectional flow of the heat transfer fluid through the HHEX and the CHEX such that heat is transferred from the HHEX to the CHEX.

2. The apparatus of claim 1, wherein a cycle time of the time-varying magnetic field is longer in the second mode than in the first mode.

3. The apparatus of claim 1, wherein the time-varying magnetic field applied to the one or more beds is suspended during the second mode.

4. The apparatus of claim 1, further comprising a fan that is configured to direct air over the CHEX.

5. The apparatus of claim 4, wherein the controller is configured to control the fan to direct air over the CHEX during the first mode.

6. The apparatus of claim 4, wherein the controller is configured to control the fan to not direct air over the CHEX during the second mode.

7. The apparatus of claim 1, wherein the one or more valves are electrically controlled valves.

8. The apparatus of claim 1, wherein the magnet is configured to move in relation to the one or more beds to effectuate the time-varying magnetic field.

9. The apparatus of claim 8, wherein the controller is configured to suspend movement of the magnet in relation to the one or more beds to effectuate the second mode.

10. The apparatus of claim 1, wherein the one or more beds are configured to move in relation to the magnet to effectuate the time-varying magnetic field.

11. The apparatus of claim 10, wherein the controller is configured to suspend movement of the one or more beds in relation to the magnet to effectuate the second mode.

12. The apparatus of claim 1, wherein the controller is configured to control the apparatus to operate in the second mode for a certain amount of time relative to the operation of the first mode.

13. The apparatus of claim 1, wherein the controller is configured to control the apparatus to operate in the second mode when the CHEX reaches a particular temperature.

14. The apparatus of claim 1, wherein the controller is configured to control the apparatus to operate in the second mode when the CHEX is at a particular temperature for a particular duration of time.

15. The apparatus of claim 1, wherein the controller is configured to control the apparatus to operate in the second mode when a compartment cooled by the CHEX is at a particular temperature.

16. The apparatus of claim 1, wherein the controller is configured to control the apparatus to operate in the first mode when a compartment cooled by the CHEX is at a particular temperature.

17. The apparatus of claim 1, wherein the controller is configured to introduce cold air from a first compartment cooled by the CHEX into a second compartment wherein the first compartment is maintained by the controller at a temperature below 0 degrees Celsius and the second compartment is maintained by the controller at a temperature above 0 degrees Celsius.

18. The apparatus of claim 1, wherein in the second mode of operation, the periodic switching of the one or more valves is suspended to further allow unidirectional flow of the heat transfer fluid through the one or more beds.

19. A dual-mode magnetic refrigeration apparatus, comprising:
   one or more beds of magnetocaloric material;
   a magnet to apply a time-varying magnetic field to the one or more beds of magnetocaloric material;
   a heat transfer fluid;
   a pump to circulate the heat transfer fluid;
   a hot side heat exchanger (HHEX);
   a cold side heat exchanger (CHEX);
   one or more valves to direct flow of the heat transfer fluid; and
   a controller configured to control periodic switching of the one or more valves to allow the apparatus to operate in a first mode and in a second mode, wherein in the first mode the one or more valves direct the heat transfer fluid to a cold end of the one or more beds through the one or more beds to a hot end of the one or more beds and through the HHEX when the time-varying magnetic field applied to the one or more beds is high, and to the hot end of the one or more beds through the one or more beds to the cold end of the one or more beds and through the CHEX when the time-varying magnetic field applied to the one or more beds is low, in order to transfer heat from the CHEX to the HHEX when an environment of the HHEX is at a higher temperature than an environment of the CHEX; and
   wherein in the second mode of operation, the periodic switching of the one or more valves is suspended to allow unidirectional flow of the heat transfer fluid through the HHEX and the CHEX such that heat is transferred from the CHEX to the HHEX when an environment of the HHEX is at a lower temperature than an environment of the CHEX.

20. The apparatus of claim 19, wherein a cycle time of the time-varying magnetic field is longer in the second mode than in the first mode.

21. The apparatus of claim 19, wherein the time-varying magnetic field applied to the one or more beds is suspended during the second mode.

22. The apparatus of claim 19, wherein the one or more valves are electrically controlled valves.

23. The apparatus of claim 19, wherein the magnet is configured to move in relation to the one or more beds to effectuate the time-varying magnetic field.

24. The apparatus of claim 23, wherein the controller is configured to suspend movement of the magnet in relation to one or more beds to effectuate the second mode.

25. The apparatus of claim 19, wherein the one or more beds are configured to move in relation to the magnet to effectuate the time-varying magnetic field.

26. The apparatus of claim 25, wherein the controller is configured to suspend movement of the one or more beds in relation to the magnet to effectuate the second mode.

27. The apparatus of claim 19, wherein in the second mode of operation, the periodic switching of the one or more valves is suspended to further allow unidirectional flow of the heat transfer fluid through the one or more beds.

* * * * *